United States Patent
Hou

(10) Patent No.: US 10,285,090 B2
(45) Date of Patent: May 7, 2019

(54) DATA OFFLOADING PATH ESTABLISHING METHOD AND DEVICE

(71) Applicant: China Academy of Telecommunications Technology, Beijing (CN)

(72) Inventor: Yunjing Hou, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 38 days.

(21) Appl. No.: 15/566,219

(22) PCT Filed: Mar. 29, 2016

(86) PCT No.: PCT/CN2016/077673
§ 371 (c)(1),
(2) Date: Oct. 13, 2017

(87) PCT Pub. No.: WO2016/165554
PCT Pub. Date: Oct. 20, 2016

(65) Prior Publication Data
US 2018/0332494 A1 Nov. 15, 2018

(30) Foreign Application Priority Data
Apr. 13, 2015 (CN) .......................... 2015 1 0173254

(51) Int. Cl.
*H04W 28/02* (2009.01)
*H04W 76/10* (2018.01)
(Continued)

(52) U.S. Cl.
CPC ......... *H04W 28/0215* (2013.01); *H04L 45/66* (2013.01); *H04L 45/745* (2013.01);
(Continued)

(58) Field of Classification Search
CPC . H04W 28/0215; H04W 28/08; H04W 40/34; H04W 72/042; H04W 76/10;
(Continued)

(56) References Cited

U.S. PATENT DOCUMENTS

2014/0082697 A1* 3/2014 Watfa .................... H04W 76/15
726/3
2014/0334446 A1 11/2014 Lim et al.
(Continued)

FOREIGN PATENT DOCUMENTS

CN 103582011 A 2/2014
CN 103716771 A 4/2014
(Continued)

OTHER PUBLICATIONS

Motorola Mobility, "Mechanisms for offloading traffic from cellular to WLAN", 3GPP TSG-RAN WG2#81 bis, R2-131342, Apr. 19, 2013 (Apr. 19, 2013), section 2.
(Continued)

*Primary Examiner* — Mewale A Ambaye
(74) *Attorney, Agent, or Firm* — Kilpatrick Townsend & Stockton LLP

(57) ABSTRACT

A data offloading path establishing method and device, for addressing a problem in which an eNB cannot offload a part of the traffic thereof to a WLAN network. The method comprises: determining, by a base station, that a user equipment (UE) is connected to a specified wireless local area network (WLAN) network, and transmitting a request message to the WLAN network; receiving, by the base station, a returned response message to the request message from the WLAN network; and transmitting, by the base station, an acknowledgement message of path switching to the UE to inform the UE that a path for offloading from the base station to the WLAN network is successfully established. Thereby, a part of the traffic originally to be transmitted via the base station can be offloaded to a WLAN access network, thus improving radio utilization rate of a 3GPP access network.

12 Claims, 8 Drawing Sheets

After ascertaining that a UE is connected to a specified WLAN, the base station transmits a request message to the WLAN, where the request message carries at least the first MAC address of the UE — 700

The base station then receives a response message returned from the WLAN for the request message, where the response message at least carries a path identifier the WLAN assigns for the request message — 701

The base station transmits a path switching acknowledgement message to the UE to notify the UE that a path for offloading data by the eNB to the WLAN is successfully established — 702

(51) Int. Cl.
    H04W 28/08      (2009.01)
    H04W 76/15      (2018.01)
    H04W 76/11      (2018.01)
    H04L 12/721     (2013.01)
    H04L 12/741     (2013.01)
    H04W 40/34      (2009.01)
    H04W 72/04      (2009.01)
    H04W 84/12      (2009.01)

(52) U.S. Cl.
    CPC .......... *H04W 28/08* (2013.01); *H04W 40/34* (2013.01); *H04W 72/042* (2013.01); *H04W 76/10* (2018.02); *H04W 76/11* (2018.02); *H04W 76/15* (2018.02); *H04W 84/12* (2013.01)

(58) Field of Classification Search
    CPC ..... H04W 76/11; H04W 76/15; H04W 84/12; H04L 45/66; H04L 45/745
    See application file for complete search history.

(56) References Cited

U.S. PATENT DOCUMENTS

| | | | |
|---|---|---|---|
| 2016/0044567 A1* | 2/2016 | Baghel | ................. H04W 28/08 370/331 |
| 2016/0112328 A1* | 4/2016 | Anand | ................... H04L 47/22 370/236.2 |
| 2016/0373987 A1* | 12/2016 | Ahmad | ............. H04W 74/0833 |
| 2018/0270741 A1* | 9/2018 | Enomoto | .............. H04W 48/00 |

FOREIGN PATENT DOCUMENTS

| | | | |
|---|---|---|---|
| EP | 2688363 | A2 | 1/2014 |
| EP | 2723120 | A1 | 4/2014 |
| WO | 2011/157152 | A3 | 12/2011 |
| WO | 2014043494 | A1 | 3/2014 |
| WO | 2014165832 | A1 | 10/2014 |
| WO | 2015002466 | A2 | 1/2015 |

OTHER PUBLICATIONS

3GPP TR 37.834 V1.1.0 (Sep. 2013), 3rd Generation Partnership Project; Technical Specification Group Radio Access Network; Study on WLAN/3GPP radio interworking (Release 12), Nov. 5, 2018, 16 pages.

3GPP TSG-RAN WG2 Meeting #89bis, R2-151656, "Control Plane Architecture for LTE-WLAN Aggregation", Qualcomm Incorporated, KT Corp., CMCC, Intel Corporation, KDDI, China Telecom, Bratislava, Slovakia, Apr. 20-24, 2015, Nov. 5, 2018, 4 pages.

* cited by examiner

DATA OFFLOADING PATH ESTABLISHING METHOD AND DEVICE

CROSS REFERENCE TO RELATED APPLICATION

This application is a US national Stage of International Application No. PCT/CN2016/077673, filed on Mar. 29, 2016, designating the United States and claiming priority to Chinese Patent Application No. 201510173254.8, filed with the Chinese Patent Office on Apr. 13, 2015 and entitled "Data Offloading Path Establishing Method and Device", the content of each of which is hereby incorporated by reference in its entirety.

FIELD

The present disclosure relates to the field of wireless technology, and particularly to a data offloading path establishing method and device.

BACKGROUND

In the field of communications, in order to improve the capacity and coverage of hotspots, apart from intensive deployment of macro cells, another approach which may be considered is to enhance the local throughput performance through intensive deployment of micro-cells. However, in this heterogeneous network scenario, there may be many problems. For example, on one hand, different transmission power of different base stations may cause power imbalance; especially in the case of co-frequency deployment, it may bring great interference to a user at an edge of a cell; and interference caused by the heterogeneous network deployment affects handover performance, especially in the case of co-frequency deployment. On the other hand, the increasing number of network nodes may increase the number of handover times, resulting in an increase in network signaling load overheads; if the backhaul between different nodes is not ideal, then one terminal cannot be served by a plurality of nodes, and thus the highest data peak rate and the optimal resource utilization cannot be achieved. Therefore, a dual-connectivity solution can be used to solve the problems existed in these heterogeneous networks. The so-called dual connectivity means that a terminal is connected to two cells at the same time, where a macro cell is used to fulfill the functions of the control plane, including connection management and mobility management.

Dual connectivity technology refers to an enhancement technology where User Equipment (UE) uses radio resources from two nodes which are connected with each other by a non-ideal link. For a UE of dual connectivity, each evolved Node B (eNB) may play a different role. These roles do not need to be associated with power levels of the eNBs and each eNB may play different roles for different UE. As shown in FIG. 1, the UE completes user plane data transmission by aggregating radio resources of the two eNBs, while control plane data is still maintained at the macro eNB.

However, since existing mechanism only supports offloading between a master eNB (MeNB) and a secondary eNB (SeNB), when a Third Generation Partnership Project (3GPP) access network is congested, a Wireless Local Area Network (WLAN) access network may be idle. In addition, the protocol stack used when an eNB transmits user data is shown in FIG. 2; the protocol stack used when a WLAN access network transmits user data is shown in FIG. 3, and through comparison, it can be seen that the wireless access technology used by the eNB is different from that used by the WLAN access network and their protocol stacks are also different, so the offloading technology used between eNBs cannot be directly used between an eNB and a WLAN access network.

It thus can be seen that the existing mechanism does not apply to offloading between an eNB and a WLAN network. Therefore, when the 3GPP access network is congested, the eNB cannot utilize the capacity of the WLAN to offload a part of traffic from the 3GPP access network to the WLAN network.

SUMMARY

An embodiment of the present disclosure provides a data offloading path establishing method and device, for addressing the problem that an eNB cannot offload a part of the traffic thereof to a WLAN network when a 3GPP access network is congested.

An embodiment of the present disclosure provides a data offloading path establishing method, applied to a base station side and the method includes:

transmitting, by the base station, a request message to a specified WLAN after ascertaining that a UE is connected to the WLAN network, where the request message at least carries a first Media Access Control (MAC) address of the UE;

receiving, by the base station, a response message returned from the WLAN for the request message, where the response message at least carries a path identifier the WLAN assigns for the request message; and transmitting, by the base station, a path switching acknowledgement message to the UE to notify the UE that a path for offloading data by the base station to the WLAN is successfully established.

Accordingly, when the 3GPP access network is congested, the WLAN access network may be idle, then a part of traffic that should be transmitted through the 3GPP access network can be offloaded to the WLAN access network via an air interface of the WLAN access network, thereby providing a user with a better service experience, and improving the radio utilization rate of the 3GPP access network, so that the throughput of the 3GPP access network is increased, the data transmission rate is improved, and the system performance is significantly optimized.

Optionally, the path identifier is a second MAC address assigned by the WLAN for the request message, or a first user plane Tunnel Endpoint Identifier (TEID) assigned by the WLAN for the request message.

Optionally, before ascertaining, by the base station, that the UE is connected to a specified WLAN, the method further includes:

if an access load of a current network is ascertained to be greater than a preset threshold, transmitting, by the base station, an offloading notification message to the UE, where the offloading notification message is configured to notify the UE of an identifier of the specified WLAN and an identifier of a radio bearer that needs to be offloaded to the WLAN; and receiving, by the base station, an offloading acknowledgement message transmitted by the UE, where the offloading acknowledgement message is configured to acknowledge that the UE accepts the operation of offloading data to the specified WLAN.

Optionally, the method further includes:

receiving, by the base station, a Radio Resource Control (RRC) message transmitted by the UE in a pre-processing stage, where the RRC message carries the first MAC address of the UE; and saving, by the base station, the first MAC address of the UE.

Optionally, the step that transmitting, by the base station, a request message to the WLAN network, where the request message at least carries a first MAC address of the UE, specifically includes:

if the base station communicates with the WLAN by way of a layer 2 frame, transmitting, by the base station, a path establishment request message to the WLAN, where the path establishment request message is configured to request the WLAN to assign a related path address parameter for the path establishment request message, and the path establishment request message carries the first MAC address of the UE; or if the base station communicates with the WLAN by way of a GTP tunnel, transmitting, by the base station, a Create Bearer Request message to the WLAN, where the Create Bearer Request message is configured to request the WLAN to assign a related path address parameter for the Create Bearer Request message, and the Create Bearer Request message carries the first MAC address of the UE and a second user plane TEID the base station assigns for a user plane.

Optionally, the step that receiving, by the base station, a response message returned from the WLAN for the request message, where the response message at least carries a path identifier the WLAN assigns for the request message, specifically includes:

if the base station communicates with the WLAN by way of a layer 2 frame, receiving, by the base station, a path establishment response message the WLAN returns for the path establishment request message, where the path establishment response message carries the second MAC address the WLAN assigns for the path establishment request message; or if the base station communicates with the WLAN by way of a GPRS Tunneling Protocol (GTP) tunnel, receiving, by the base station, a Create Bearer Response message the WLAN returns for the Create Bearer Request message, where the Create Bearer Response message at least carries a first bearer identifier and a first user plane TEID the WLAN assigns for the Create Bearer Request message.

Optionally, after the base station transmits a path switching acknowledgement message to the UE, the method further includes:

communicating, by the base station, a first part of data with the UE through the WLAN based on the path identifier, where the first part of data is data that the base station needs to communicate with the UE through the WLAN.

Optionally, the step that communicating, by the base station, a first part of data with the UE through the WLAN based on the path identifier, where the first part of data is data that the base station needs to communicate with the UE through the WLAN, specifically includes:

if the base station communicates with the WLAN by way of a layer 2 frame, establishing, by the base station, at least one offloading path between the base station and the WLAN based on the path establishment request message and the path establishment response message; and receiving, by the base station, an uplink data packet forwarded by the WLAN, re-encapsulating the uplink data packet into a first uplink data packet and transmitting the first uplink data packet using an S1 bearer; and receiving downlink data from an S1 bearer corresponding to the at least one offloading path, encapsulating the downlink data into a downlink data packet of a MAC frame, forwarding the downlink data packet to the WLAN, re-encapsulating the downlink data packet into a first downlink data packet and transmitting the first downlink data packet to the UE through the WLAN, thus finishing the communication of the first part of data; where, when the uplink data packet is transmitted between the UE and the WLAN, a source MAC address of the uplink data packet after encapsulation is the first MAC address and a destination MAC address of the uplink data packet after encapsulation is an original MAC address of the WLAN, and when the uplink data packet is transmitted between the WLAN and the base station, the source MAC address of the uplink data packet after encapsulation is the second MAC address and the destination MAC address of the uplink data packet after encapsulation is the MAC address of the base station, a source MAC address of the downlink data packet after encapsulation is a MAC address of the base station and a destination MAC address of the downlink data packet after encapsulation is the second MAC address, a source MAC address of the first downlink data packet after encapsulation is the second MAC address, and a destination MAC address of the first downlink data packet after encapsulation is the first MAC address.

Optionally, the step that communicating, by the base station, a first part of data with the UE through the WLAN based on the path identifier, where the first part of data is data that the base station needs to communicate with the UE through the WLAN, specifically includes:

if the base station communicates with the WLAN by way of a GTP tunnel, creating, by the base station, a new bearer between the base station and the WLAN based on the Create Bearer Request message and the Create Bearer Response message; and receiving, by the base station, over the new bearer, an uplink data packet forwarded by the WLAN, forwarding the uplink data packet to an S1 bearer corresponding to the new bearer for transmission after receiving the uplink data packet over the new bearer; and receiving downlink data from the S1 bearer corresponding to at least one radio bearer identifier, forwarding the downlink data to the new bearer corresponding to the S1 bearer, encapsulating the downlink data into a second downlink data packet of a MAC frame and transmitting the second downlink data packet to the UE through the WLAN, thus finishing the communication of a second part of data; where, when the uplink data packet is transmitted between the UE and the WLAN, a source MAC address of the uplink data packet after encapsulation is the first MAC address and a destination MAC address of the uplink data packet after encapsulation is an original MAC address of the WLAN, a source MAC address of the second downlink data packet after encapsulation is the MAC address of the WLAN and a destination MAC address of the second downlink data packet after encapsulation is the first MAC address.

An embodiment of the present disclosure provides a data offloading path establishing method, applied to a WLAN and the method includes:

receiving, by the WLAN, a request message transmitted by a base station, where the request message at least carries a first MAC address of a UE; and assigning, by the WLAN, a path identifier for the request message, and transmitting a response message to the base station to notify the base station of related path establishment information, where the response message carries the path identifier the WLAN assigns.

Accordingly, when the 3GPP access network is congested, the WLAN access network may be idle, then a part of traffic that should be transmitted through the 3GPP access network can be offloaded to the WLAN access network via an air interface of the WLAN access network, thereby providing a user with a better service experience, and improving the radio utilization rate of the 3GPP access network, so that the throughput of the 3GPP access network is increased, the data transmission rate is improved, and the system performance is significantly optimized.

Optionally, the path identifier is a second MAC address assigned by the WLAN for the request message, or a first user plane TEID assigned by the WLAN for the request message.

Optionally, the step that assigning, by the WLAN, a path identifier for the request message specifically includes:

assigning, by a gateway in the WLAN, the path identifier for the request message; or assigning, by an Access Point (AP) in the WLAN, the path identifier for the request message;

where the path identifier is used to identify a transmission path, between the WLAN and the base station, for a first part of data to be offloaded.

Optionally, the step that receiving, by the WLAN, a request message transmitted by a base station, where the request message at least carries a first MAC address of UE, specifically includes:

if the WLAN communicates with the base station by way of a layer 2 frame, receiving, by the WLAN, a path establishment request message transmitted by the base station, where the path establishment request message is configured to request the WLAN to assign a related path address parameter for the path establishment request message, and the path establishment request message carries the first MAC address of the UE; or if the WLAN communicates with the base station by way of a GTP tunnel, receiving, by the WLAN, a Create Bearer Request message transmitted by the base station, where the Create Bearer Request message is configured to request the WLAN to assign a related path address parameter for the Create Bearer Request message, and the Create Bearer Request message carries the first MAC address of the UE and a second user plane TEID the base station assigns for a user plane.

Optionally, the step that assigning, by the WLAN, a path identifier for the request message, and transmitting a response message to the base station to notify the base station of related path establishment information, where the response message carries the path identifier the WLAN assigns, specifically includes:

if the WLAN communicates with the base station by way of a layer 2 frame, assigning, by the WLAN, the path identifier for the request message and transmitting a path establishment response message to the base station to notify the base station of the related path establishment information, where the path establishment response message carries the second MAC address the WLAN assigns for the path establishment request message; or if the WLAN communicates with the base station by way of a GTP tunnel, assigning, by the WLAN, the path identifier for the request message and transmitting a Create Bearer Response message to the base station to notify the base station of the related path establishment information, where the Create Bearer Response message at least carries a first bearer identifier and the first user plane TEID the WLAN assigns for the Create Bearer Request message.

An embodiment of the present disclosure provides a data offloading path establishing device, applied to a base station side, and the device includes:

a transmitting unit, configured to, transmit a request message to a specified WLAN after ascertaining that a UE is connected to the WLAN network, wherein the request message at least carries a first MAC address of the UE;

a receiving unit, configured to receive a response message returned from the WLAN for the request message, wherein the response message at least carries a path identifier the WLAN assigns for the request message; and an acknowledging unit, configured to transmit a path switching acknowledgement message to the UE to notify the UE that a path for offloading data by the base station to the WLAN is successfully established.

Accordingly, when the 3GPP access network is congested, the WLAN access network may be idle, then a part of traffic that should be transmitted through the 3GPP access network can be offloaded to the WLAN access network via an air interface of the WLAN access network, thereby providing a user with a better service experience, and improving the radio utilization rate of the 3GPP access network, so that the throughput of the 3GPP access network is increased, the data transmission rate is improved, and the system performance is significantly optimized.

Optionally, the path identifier received by the receiving unit is a second MAC address or a first user plane TEID assigned by the WLAN for the request message.

Optionally, before ascertaining that the UE is connected to a specified WLAN, the transmitting unit is further configured to:

if an access load of a current network is ascertained to be greater than a preset threshold, transmit an offloading notification message to the UE, where the offloading notification message is configured to notify the UE of an identifier of the specified WLAN and an identifier of a radio bearer that needs to be offloaded to the WLAN; and receive an offloading acknowledgement message transmitted by the UE, where the offloading acknowledgement message is configured to acknowledge that the UE accepts the operation of offloading data to the specified WLAN.

Optionally, the receiving unit is further configured to:

receive an RRC message transmitted by the UE in a pre-processing stage, where the RRC message carries the first MAC address of the UE; and save the first MAC address of the UE.

Optionally, when transmitting a request message to the WLAN, the transmitting unit is specifically configured to:

if the base station communicates with the WLAN by way of a layer 2 frame, transmit a path establishment request message to the WLAN, where the path establishment request message is configured to request the WLAN to assign a related path address parameter for the path establishment request message, and the path establishment request message carries the first MAC address of the UE; or if the base station communicates with the WLAN by way of a GTP tunnel, transmit a Create Bearer Request message to the WLAN, where the Create Bearer Request message is configured to request the WLAN to assign a related path address parameter for the Create Bearer Request message, and the Create Bearer Request message carries the first MAC address of the UE and a second user plane TEID the base station assigns for a user plane.

Optionally, when receiving a response message returned from the WLAN for the request message, the receiving unit is specifically configured to:

if the base station communicates with the WLAN by way of a layer 2 frame, receive a path establishment response message the WLAN returns for the path establishment request message, where the path establishment response message carries the second MAC address the WLAN assigns for the path establishment request message; or if the base station communicates with the WLAN by way of a GTP tunnel, receive a Create Bearer Response message the WLAN returns for the Create Bearer Request message, where the Create Bearer Response message at least carries a first bearer identifier and a first user plane TEID the WLAN assigns for the Create Bearer Request message.

Optionally, the device further includes:

a communicating unit, configured to communicate a first part of data with the UE through the WLAN based on the path identifier after the path switching acknowledgement message is transmitted to the UE, where the first part of data is data that the base station needs to communicate with the UE through the WLAN.

Optionally, when communicating a first part of data with the UE through the WLAN based on the path identifier, the communicating unit is specifically configured to:

if the base station communicates with the WLAN by way of a layer 2 frame, establish at least one offloading path between the base station and the WLAN based on the path establishment request message and the path establishment response message; and receive an uplink data packet forwarded by the WLAN, re-encapsulate the uplink data packet into a first uplink data packet and transmit the first uplink data packet using an S1 bearer; and receive downlink data from an S1 bearer corresponding to the at least one offloading path, encapsulate the downlink data into a downlink data packet of a MAC frame, forward the downlink data packet to the WLAN, re-encapsulate the downlink data packet into a first downlink data packet and transmit the first downlink data packet to the UE through the WLAN, thus finishing the communication of the first part of data; where, when the uplink data packet is transmitted between the UE and the WLAN, a source MAC address of the uplink data packet after encapsulation is the first MAC address and a destination MAC address of the uplink data packet after encapsulation is an original MAC address of the WLAN, and when the uplink data packet is transmitted between the WLAN and the base station, the source MAC address of the uplink data packet after encapsulation is the second MAC address and the destination MAC address of the uplink data packet after encapsulation is the MAC address of the base station, a source MAC address of the downlink data packet after encapsulation is a MAC address of the base station and a destination MAC address of the downlink data packet after encapsulation is the second MAC address, a source MAC address of the first downlink data packet after encapsulation is the second MAC address, and a destination MAC address of the first downlink data packet after encapsulation is the first MAC address.

Optionally, when communicating a first part of data with the UE through the WLAN based on the path identifier, where the first part of data is data that the base station needs to communicate with the UE through the WLAN, the communicating unit is specifically configured to:

if the base station communicates with the WLAN by way of a GTP tunnel, create a new bearer between the base station and the WLAN based on the Create Bearer Request message and the Create Bearer Response message; and receive over the new bearer, an uplink data packet forwarded by the WLAN, forward the uplink data packet to an S1 bearer corresponding to the new bearer for transmission after receiving the uplink data packet over the new bearer; and receive downlink data from the S1 bearer corresponding to at least one radio bearer identifier, forward the downlink data to the new bearer corresponding to the S1 bearer, encapsulate the downlink data into a second downlink data packet of a MAC frame and transmit the second downlink data packet to the UE through the WLAN, thus finishing the communication of a second part of data; where, when the uplink data packet is transmitted between the UE and the WLAN, a source MAC address of the uplink data packet after encapsulation is the first MAC address and a destination MAC address of the uplink data packet after encapsulation is an original MAC address of the WLAN, a source MAC address of the second downlink data packet after encapsulation is the MAC address of the WLAN and a destination MAC address of the second downlink data packet after encapsulation is the first MAC address.

An embodiment of the present disclosure provides a data offloading path establishing device, applied to a WLAN and the device includes:

a receiving unit, configured to receive a request message transmitted by a base station, where the request message at least carries a first MAC address of a UE; and a transmitting unit, configured to assign a path identifier for the request message and transmit a response message to the base station to notify the base station of related path establishment information, where the response message carries the path identifier the WLAN assigns.

Accordingly, when the 3GPP access network is congested, the WLAN access network may be idle, then a part of traffic that should be transmitted through the 3GPP access network can be offloaded to the WLAN access network via an air interface of the WLAN access network, thereby providing a user with a better service experience, and improving the radio utilization rate of the 3GPP access network, so that the throughput of the 3GPP access network is increased, the data transmission rate is improved, and the system performance is significantly optimized.

Optionally, the path identifier assigned by the transmitting unit is a second MAC address assigned for the request message or a first user plane TEID assigned by the WLAN for the request message.

Optionally, when receiving a request message transmitted by the base station, the receiving unit is specifically configured to:

if the device communicates with the base station by way of a layer 2 frame, receive a path establishment request message transmitted by the base station, where the path establishment request message is configured to request the WLAN to assign a related path address parameter for the path establishment request message, and the path establishment request message carries the first MAC address of the UE; or if the device communicates with the base station by way of a GTP tunnel, receive a Create Bearer Request message transmitted by the base station, where the Create Bearer Request message is configured to request the WLAN to assign a related path address parameter for the Create Bearer Request message, and the Create Bearer Request message carries the first MAC address of the UE and a second user plane TEID the base station assigns for a user plane.

Optionally, when assigning a path identifier for the request message, and transmitting a response message to the base station to notify the base station of related path establishment information, the transmitting unit is specifically configured to:

if the WLAN communicates with the base station by way of a layer 2 frame, assign the path identifier for the request message and transmit a path establishment response message to the base station to notify the base station of the related path establishment information, where the path establishment response message carries the second MAC address the WLAN assigns for the path establishment request message; or if the WLAN communicates with the base station by way of a GTP tunnel, assign the path identifier for the request message and transmit a Create Bearer Response message to the base station to notify the base station of the related path establishment information, where the Create Bearer Response message at least carries a first bearer identifier and the first user plane TED the WLAN assigns for the Create Bearer Request message.

An embodiment of the present disclosure provides a network side device, including:

a processor, configured to read a program in a memory and to perform the following operations:

transmitting, through a transceiver, a request message to a specified WLAN after ascertaining that a UE is connected to the WLAN, where the request message at least carries a first MAC address of the UE; receiving, through the transceiver, a response message returned from the WLAN for the request message, where the response message at least carries a path identifier the WLAN assigns for the request message; and transmitting, through the transceiver, a path switching acknowledgement message to the UE to notify the UE that a path for offloading data by the base station to the WLAN is successfully established.

Accordingly, when the 3GPP access network is congested, the WLAN access network may be idle, then a part of traffic that should be transmitted through the 3GPP access network can be offloaded to the WLAN access network via an air interface of the WLAN access network, thereby providing a user with a better service experience, and improving the radio utilization rate of the 3GPP access network, so that the throughput of the 3GPP access network is increased, the data transmission rate is improved, and the system performance is significantly optimized.

Optionally, the path identifier received by the transceiver is a second MAC address assigned by the WLAN for the request message or a first user plane TEID assigned by the WLAN for the request message.

Optionally, before ascertaining that the UE is connected to a specified WLAN, the processor is further configured to:

if an access load of a current network is ascertained to be greater than a preset threshold, transmit, through the transceiver, an offloading notification message to the UE, where the offloading notification message is configured to notify the UE of an identifier of the specified WLAN and an identifier of a radio bearer that needs to be offloaded to the WLAN; and receive, through the transceiver, an offloading acknowledgement message transmitted by the UE, where the offloading acknowledgement message is configured to acknowledge that the UE accepts the operation of offloading data to the specified WLAN.

Optionally, the processor is further configured to:

receive, through the transceiver, an RRC message transmitted by the UE in a pre-processing stage, where the RRC message carries the first MAC address of the UE; and save the first MAC address of the UE.

Optionally, when transmitting, through the transceiver, a request message to the WLAN, the processor is specifically configured to:

if the base station communicates with the WLAN by way of a layer 2 frame, transmit, through the transceiver, a path establishment request message to the WLAN, where the path establishment request message is configured to request the WLAN to assign a related path address parameter for the path establishment request message, and the path establishment request message carries the first MAC address of the UE; or if the base station communicates with the WLAN by way of a GTP tunnel, transmit, through the transceiver, a Create Bearer Request message to the WLAN, where the Create Bearer Request message is configured to request the WLAN to assign a related path address parameter for the Create Bearer Request message, and the Create Bearer Request message carries the first MAC address of the UE and a second user plane TEID the base station assigns for a user plane.

Optionally, when receiving, through the transceiver, a response message returned from the WLAN for the request message, the processor is specifically configured to:

if the base station communicates with the WLAN by way of a layer 2 frame, receive, through the transceiver, a path establishment response message the WLAN returns for the path establishment request message, where the path establishment response message carries the second MAC address the WLAN assigns for the path establishment request message; or if the base station communicates with the WLAN by way of a GTP tunnel, receive, through the transceiver, a Create Bearer Response message the WLAN returns for the Create Bearer Request message, where the Create Bearer Response message at least carries a first bearer identifier and a first user plane TEID the WLAN assigns for the Create Bearer Request message.

Optionally, the processor is further configured to communicate a first part of data with the UE through the WLAN based on the path identifier after a path switching acknowledgement message is transmitted to the UE through the transceiver, where the first part of data is data that the base station needs to communicate with the UE through the WLAN.

Optionally, when communicating a first part of data with the UE through the WLAN based on the path identifier, the processor is specifically configured to:

if the base station communicates with the WLAN by way of a layer 2 frame, establish at least one offloading path between the base station and the WLAN based on the path establishment request message and the path establishment response message; and receive an uplink data packet forwarded by the WLAN, re-encapsulate the uplink data packet into a first uplink data packet and transmit the first uplink data packet using an S1 bearer; and receive downlink data from an S1 bearer corresponding to the at least one offloading path, encapsulate the downlink data into a downlink data packet of a MAC frame, forward the downlink data packet to the WLAN, re-encapsulate the downlink data packet into a first downlink data packet and transmit the first downlink data packet to the UE through the WLAN, thus finishing the communication of the first part of data; where, when the uplink data packet is transmitted between the UE and the WLAN, a source MAC address of the uplink data packet after encapsulation is the first MAC address and a destination MAC address of the uplink data packet after encapsulation is an original MAC address of the WLAN, and when the uplink data packet is transmitted between the WLAN and the base station, the source MAC address of the uplink data packet after encapsulation is the second MAC address and the destination MAC address of the uplink data packet after encapsulation is the MAC address of the base station, a source MAC address of the downlink data packet after encapsulation is a MAC address of the base station and a destination MAC address of the downlink data packet after encapsulation is the second MAC address, a source MAC address of the first downlink data packet after encapsulation is the second MAC address, and a destination MAC address of the first downlink data packet after encapsulation is the first MAC address.

Optionally, when communicating a first part of data with the UE through the WLAN based on the MAC address and the path identifier, the processor is specifically configured to:

if the base station communicates with the WLAN by way of a GTP tunnel, create a new bearer between the base station and the WLAN based on the Create Bearer Request message and the Create Bearer Response message; and receive over the new bearer, an uplink data packet forwarded by the WLAN, forward the uplink data packet to an S1 bearer corresponding to the new bearer for transmission after receiving the uplink data packet over the new bearer; and receive downlink data from the S1 bearer corresponding to at least one radio bearer identifier, forward the downlink data to the new bearer corresponding to the S1 bearer, encapsulate the downlink data into a second downlink data packet of a MAC frame and transmit the second downlink data packet to the UE through the WLAN, thus finishing the communication of a second part of data; where, when the uplink data packet is transmitted between the UE and the WLAN, a source MAC address of the uplink data packet after encapsulation is the first MAC address and a destination MAC address of the uplink data packet after encapsulation is an original MAC address of the WLAN, a source MAC address of the second downlink data packet after encapsulation is the MAC address of the WLAN and a destination MAC address of the second downlink data packet after encapsulation is the first MAC address.

The transceiver is configured to receive and transmit data under the control of the processor.

An embodiment of the present disclosure provides a network side device, including:

a processor, configured to read a program in a memory and to perform the following operations: receiving, through a transceiver, a request message transmitted by a base station, where the request message at least carries a first MAC address of a UE; and assigning a path identifier for the request message, and transmitting, through the transceiver, a response message to the base station to notify the base station of related path establishment information, where the response message carries the path identifier the WLAN assigns.

Accordingly, when the 3GPP access network is congested, the WLAN access network may be idle, then a part of traffic that should be transmitted through the 3GPP access network can be offloaded to the WLAN access network via an air interface of the WLAN access network, thereby providing a user with a better service experience, and improving the radio utilization rate of the 3GPP access network, so that the throughput of the 3GPP access network is increased, the data transmission rate is improved, and the system performance is significantly optimized.

Optionally, the path identifier assigned by the processor is a second MAC address assigned by the WLAN for the request message, or a first user plane TEID assigned by the WLAN for the request message.

Optionally, when receiving, through the transceiver, a request message transmitted by a base station, the processor is specifically configured to:

if the WLAN communicates with the base station by way of a layer 2 frame, receive, through the transceiver, a path establishment request message transmitted by the base station, where the path establishment request message is configured to request the WLAN to assign a related path address parameter for the path establishment request message, and the path establishment request message carries the first MAC address of the UE; or if the WLAN communicates with the base station by way of a GTP tunnel, receive, through the transceiver, a Create Bearer Request message transmitted by the base station, where the Create Bearer Request message is configured to request the WLAN to assign a related path address parameter for the Create Bearer Request message, and the Create Bearer Request message carries the first MAC address of the UE and a second user plane TEID the base station assigns for a user plane.

Optionally, when a path identifier is assigned for the request message and a response message is transmitted to the base station through the transceiver to notify the base station of the related path establishment information, the processor is specifically configured to:

if the network side device communicates with the base station by way of a layer 2 frame, assign the path identifier for the request message and transmit a path establishment response message to the base station through the transceiver to notify the base station of the related path establishment information, where the path establishment response message carries a second MAC address the WLAN assigns for the path establishment request message; or if the network side device communicates with the base station by way of a GTP tunnel, assign a path identifier for the request message and transmit a Create Bearer Response message to the base station through the transceiver to notify the base station of the related path establishment information, where the Create Bearer Response message at least carries a first bearer identifier and the first user plane TEID the WLAN assigns for the Create Bearer Request message.

The transceiver is configured to receive and transmit data under the control of the processor.

DETAILED DESCRIPTION OF THE EMBODIMENTS

The technical solutions according to the embodiments of the present disclosure will now be described clearly and completely in conjunction with the accompanying drawings according to the embodiments of the present disclosure, and it will be apparent that the described embodiments are merely a part, not all, of the embodiments of the present disclosure. All other embodiments obtained based on embodiments in the present disclosure, by those of ordinary skill in the art without making creative work fall within the scope of the present disclosure.

Dual-connectivity technology means that a UE establishes connections with two eNBs at the same time, and transmits user data using radio resources of two eNBs at the same time. The two eNBs have different functions, one is an MeNB and the other is an SeNB, where the MeNB controls offloading operation.

Figure 1:
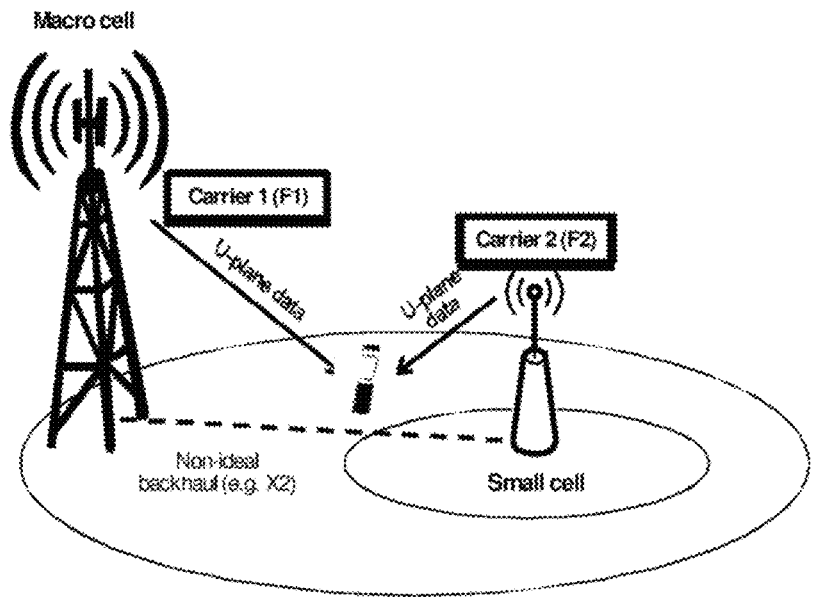
FIG. 1 is a schematic diagram of an existing dual connectivity.
Figure 2:
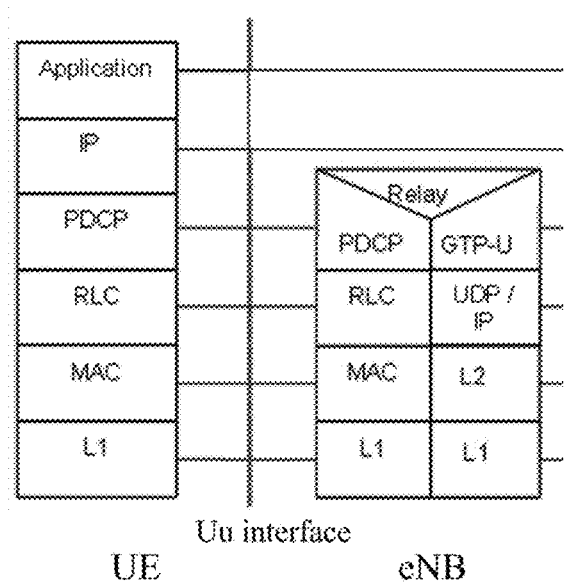
FIG. 2 is a schematic diagram of a protocol stack used when an eNB transmits user data.
Figure 3:
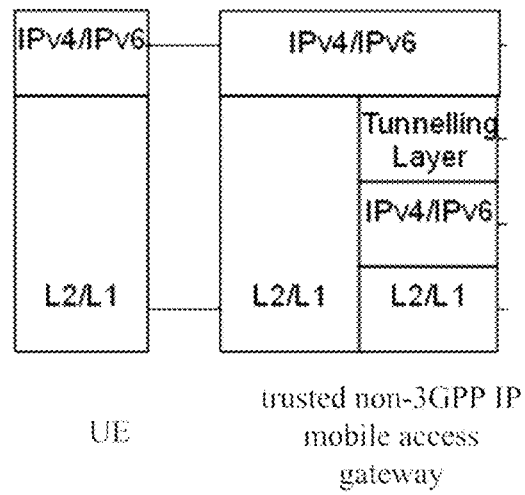
FIG. 3 is a schematic diagram of a protocol stack used when a WLAN access network transmits user data.
Figure 4:
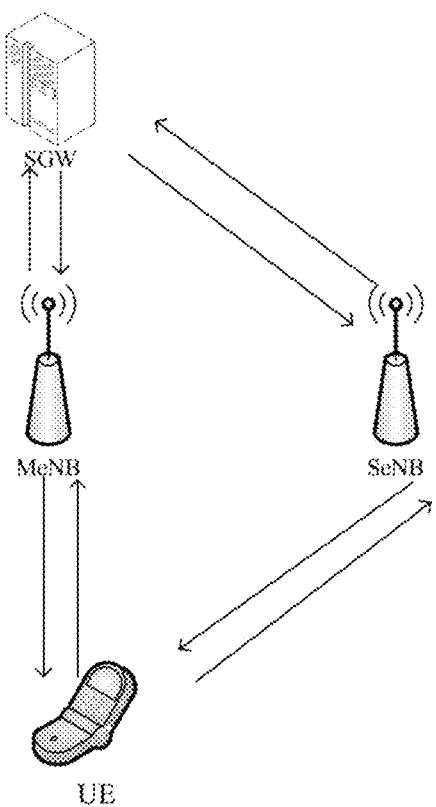
FIG. 4 is a schematic diagram showing that a service gateway directly offloads data to a master cell and a secondary cell.
Figure 5A:
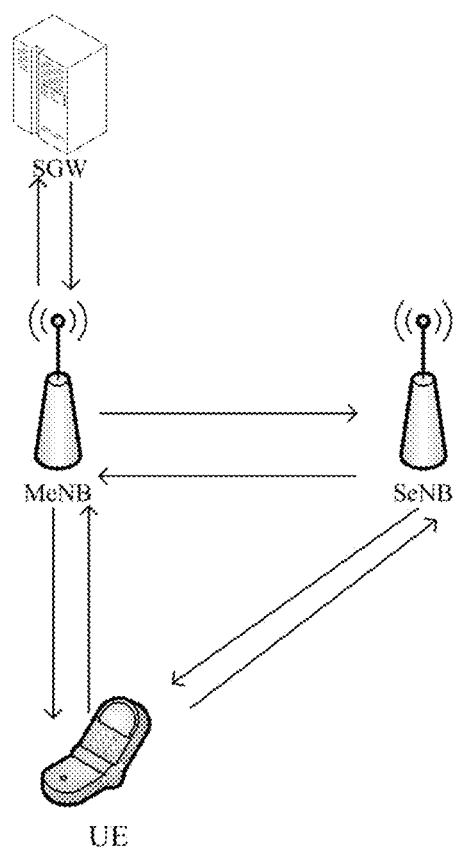
FIG. 5A and FIG. 5B are schematic diagrams showing that a master cell offloads data to the secondary cell.

The dual-connectivity technology supports offloading in two ways which differ from each other in the offloading point. The offloading point of one offloading way is a Serving Gateway (SGW) in a core network. In this offloading way, the SGW directly offloads traffic to the MeNB and the SeNB, and the MeNB determines which traffic the SGW will send to the UE through the SeNB. The schematic diagram of this offloading way is as shown in FIG. 4. The offloading point of the other offloading way is the MeNB. In this offloading way, the SGW transmits all the traffic of a user to the MeNB (that is, the SGW does not perform offloading), and the MeNB transmits a part of the user's traffic to the UE through the SeNB. The schematic diagram of such an offloading way is as shown in FIG. 5A.

Figure 5B:
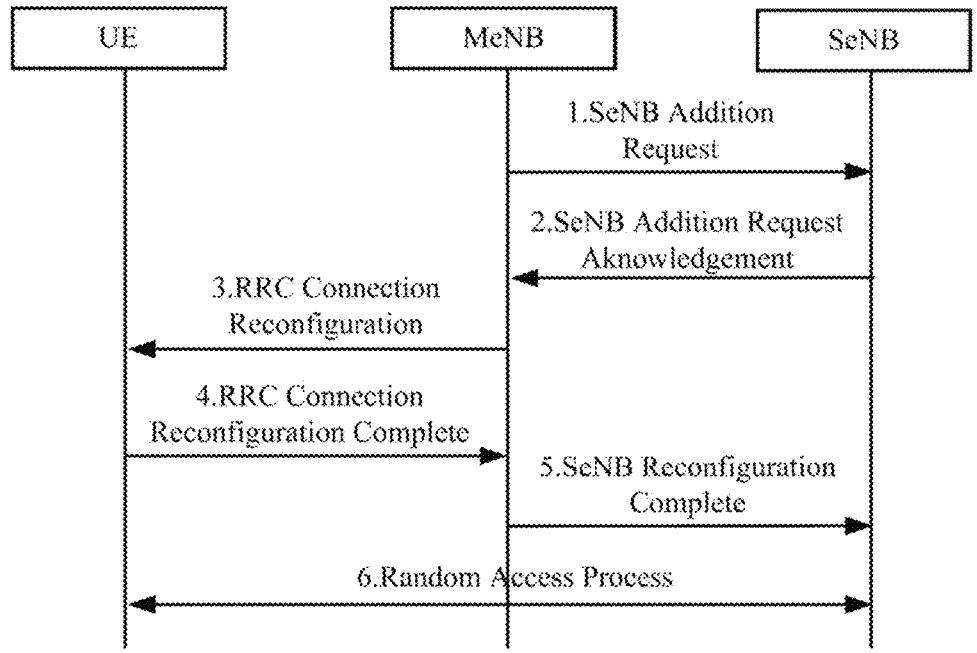

Since embodiments of the present disclosure mainly focus on the method in which an eNB directly offloads data to a WLAN and this offloading method is the same as the method in which an MeNB offloads data to an SeNB in the formal sense, the method in which an MeNB offloads data to an SeNB is described in detail herein, and the process of implementing the offloading from an MeNB to an SeNB is as shown in FIG. 5B.

Step1: an MeNB decides to select an SeNB for a UE, and the MeNB initiates an SeNB Addition Request message to the SeNB, requesting the SeNB to allocate an air interface resource for an Evolved Radio Access Bearer (E-RAB) to be offloaded, and to indicate parameters, such as attribute information of the E-RAB (information such as an E-RAB parameter, and TNL), and UE capability information. The MeNB may also include a configuration of a Master Cell Group (MCG) and UE capability information in a Secondary Cell Group Configuration Information Element (SCG-ConfigInfoIE). The MeNB may also provide the latest measurement results of Secondary Cell Group (SCG) cell(s). The SeNB can reject the request.

Step2: If a Radio Resource Management (RRM) entity of the SeNB decides to accept the resource allocation request, the SeNB may allocate a corresponding radio resource and transmission network resource.

Step3: If the MeNB accepts the new configuration of the SeNB, it may trigger an RRC Connection Reconfiguration process, and the UE may start applying a new configuration.

Step4: After the UE has completed the reconfiguration, an RRC Connection Reconfiguration Complete message is transmitted. If the UE cannot apply the configuration, a reconfiguration failure process may be performed.

Step5: The MeNB notifies the SeNB that the UE has successfully completed the reconfiguration process.

Step6: The UE initiates a random access process to the SeNB, where Step 4 and Step 6 do not define a strict sequential relationship.

Figure 6:
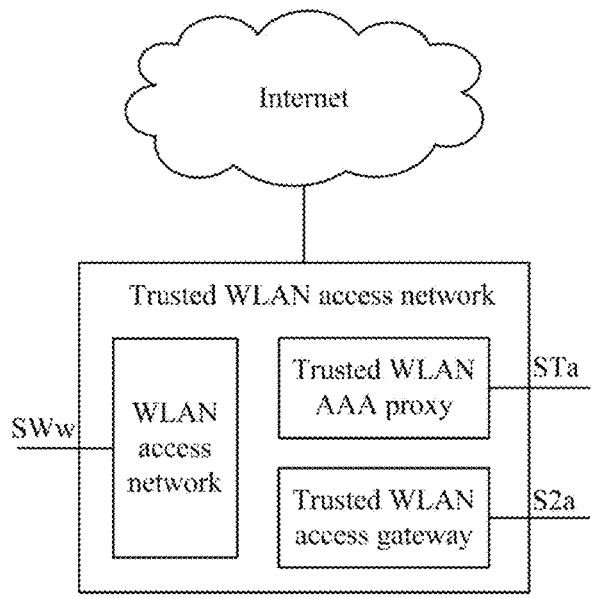
FIG. 6 is a schematic diagram of a logical structure of a WLAN access network.

Since embodiments of the present disclosure mainly focus on the method in which an eNB directly offloads data to a WLAN, the logical structure of the WLAN access network includes an access point, a gateway, an authentication device, and etc., a Trusted WLAN Access Network (TWAN) is taken as an example herein to illustrate a logical structure of the WLAN access network, as shown in FIG. 6. In a specific implementation, all modules of the logical architecture may be implemented in a same physical entity, or in different physical entities, respectively. The embodiments of the present disclosure do not limit which of the logical modules in the WLAN the eNB offloads data to. For the WLAN that accesses the operator's core network, whether it is trusted depends on the operator's settings. The architecture in FIG. 6 includes the following logical entities.

The WLAN Access Network (WLAN AN) consists of one or more WLAN APs that terminate the UE's WLAN IEEE 802.11 link.

The Trusted WLAN Access Gateway (TWAG) is responsible for forwarding the UE's data to the operator's core network, where:

1) if the TWAN provides an Evolved Packet Core (EPC) access to the UE using a Transparent Single-Connection mode (TSCM) or a Single-Connection mode (SCM), the TWAG forwards a data packet between a UE-TWAG point-to-point link and an S2a tunnel of the UE;

2) if the TWAN provides the EPC access to the UE using a Multi-Connection mode (MCM), the TWAG forwards user plane data between a UE-TWAG point-to-point link associated with a particular Packet Data Network (PDN) connection and an associated S2a tunnel;

3) If the TWAN provides the EPC access to the UE using the MCM, WLAN Control Protocol (WLCP) signaling is used between the UE and the TWAG.

A trusted WLAN AAA Proxy (TWAP) is responsible for authenticating the UE and transferring AAA information between the WLAN AN and a 3GPP Authentication, Authorization and Accounting (AAA) server or a 3GPP AAA proxy.

Figure 7:
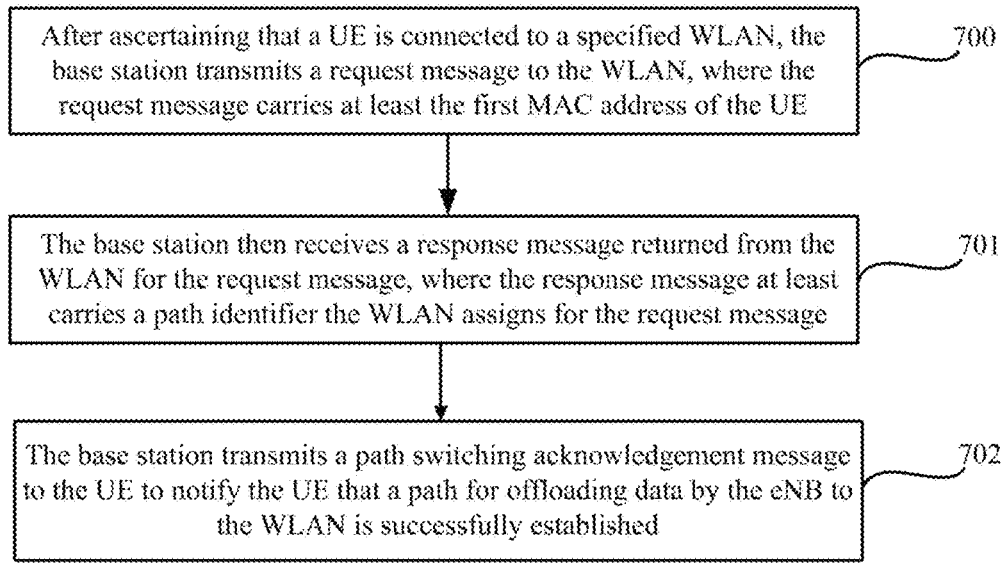
FIG. 7 is a schematic flow chart of a path establishing method according to a first embodiment of the disclosure.

Based on the method in which the MeNB offloads traffic to the SeNB, referring to FIG. 7, the first embodiment of the present disclosure provides a path establishing method for an eNB directly offloading data to a WLAN, applied to a base station side. The specific flow is as follows.

Step 700: After ascertaining that a UE is connected to a specified WLAN, the base station transmits a request message to the WLAN, where the request message carries at least the first MAC address of the UE.

Moreover, during the preprocessing phase, the base station receives an RRC message transmitted by the UE, the RRC message carrying the first MAC address of the UE; and then the base station saves the first MAC address of the UE.

For example, the UE may transmit its MAC address to the eNB by carrying the MAC address in the RRC connection reconfiguration complete message (specifically referring to 3GPP TS 36.331). The eNB stores the information locally. Note that the MAC address is the original MAC address of the UE, that is, the factory burn-in MAC address of the equipment.

Moreover, before ascertaining that the UE is connected to the specified WLAN, if an access load of a current network is ascertained to be greater than a preset threshold, the base station transmits an offloading notification message to the UE, where the offloading notification message is configured to notify the UE of an identifier of the specified WLAN and an identifier of a radio bearer that needs to be offloaded to the WLAN; and the base station receives an offloading acknowledgement message transmitted by the UE, where the offloading acknowledgement message is configured to acknowledge that the UE accepts the operation of offloading data to the specified WLAN.

Figure 8:
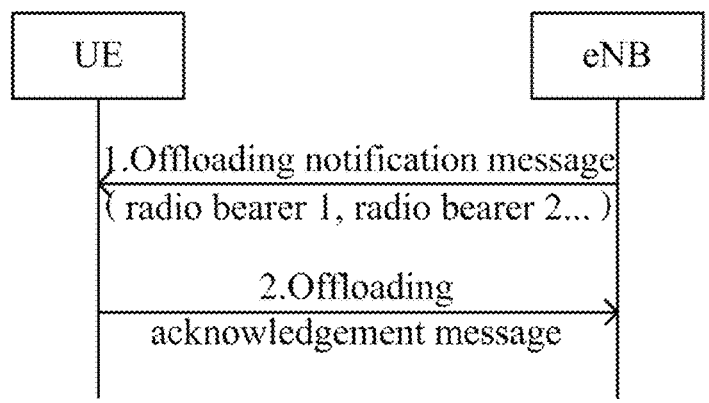
FIG. 8 is a schematic flow chart of offloading determination of an eNB according to the first embodiment of the disclosure.

For example, before ascertaining that the UE is connected to the specified WLAN, if ascertaining that the load of the current network is too heavy, the eNB decides to perform offloading and triggers the offloading operation through the following process, as shown in FIG. 8. After deciding to perform offloading, the eNB also needs to ascertain whether the UE accepts the connection to the specified WLAN or not, and if it is ascertained that the UE accepts the connection to the specified WLAN, the eNB triggers the following process.

Step1: The eNB decides to perform offloading and transmits an offloading notification message to the UE, where parameters in the offloading notification message are an identifier of a radio bearer that needs to be offloaded and the identifier of the specified WLAN, and there may be more than one radio bearer identifier herein.

Step2: The UE transmits the offloading acknowledgement message to the eNB; after the eNB receives the offloading acknowledgement message, the eNB initiates a path transfer process.

Specifically, after the UE has received the offloading notification message transmitted by the eNB, if the current UE accepts the offloading operation, then the UE further ascertains whether or not it has already been connected to the specified WLAN and ascertains whether or not it is currently connected to the specified WLAN; if so, the UE transmits an offloading acknowledgement message to the eNB; or otherwise, after initiating a request for connecting with the specified WLAN, the UE transmits the offloading acknowledgement message to the eNB.

Specifically, the base station transmits a request message to the WLAN, particularly in the following two cases.

The first case: if the base station communicates with the WLAN by way of a layer 2 frame, the base station transmits a path establishment request message to the WLAN, where the path establishment request message is configured to request the WLAN to assign a related path address parameter for the path establishment request message, and the path establishment request message carries the first MAC address of the UE.

The second case: if the base station communicates with the WLAN by way of a GTP tunnel, the base station transmits a Create Bearer Request message to the WLAN, where the Create Bearer Request message is configured to request the WLAN to assign a related path address parameter for the Create Bearer Request message, and the Create Bearer Request message carries the first MAC address of the UE and a second user plane TEID the base station assigns for a user plane.

Step 701: the base station then receives a response message returned from the WLAN for the request message, where the response message at least carries a path identifier the WLAN assigns for the request message.

The path identifier may be a second MAC address the WLAN assigns for the request message, or a first user plane TEID the WLAN assigns for the request message.

Specifically, the operation that the base station receives the response message returned from the WLAN for the request message, where the response message at least carries a path identifier the WLAN assigns for the request message, particularly includes the following cases.

The first case: if the base station communicates with the WLAN by way of a layer 2 frame, then the base station receives a path establishment response message the WLAN returns for the path establishment request message, where the path establishment response message carries the second MAC address the WLAN assigns for the path establishment request message.

The second case: if the base station communicates with the WLAN by way of a GTP tunnel, then the base station receives a Create Bearer Response message the WLAN returns for the Create Bearer Request message, where the Create Bearer Response message at least carries a first bearer identifier and a first user plane TEID the WLAN assigns for the Create Bearer Request message.

Step 702: the base station transmits a path switching acknowledgement message to the UE to notify the UE that a path for offloading data by the eNB to the WLAN is successfully established.

Moreover, the base station communicates a first part of data with the UE through the WLAN based on the path identifier after the base station transmits the path switching acknowledgement message to the UE, where the first part of data is data that the base station needs to communicate with the UE through the WLAN.

Specifically, the base station communicates the first part of data with the UE through the WLAN based on the path identifier, particularly in the following two cases.

The first case: if the base station communicates with the WLAN by way of a layer 2 frame, the base station establishes at least one offloading path between the base station and the WLAN based on the path establishment request message and the path establishment response message; and the base station receives an uplink data packet forwarded by the WLAN, re-encapsulates the uplink data packet into a first uplink data packet, and transmits the first uplink data packet using an S1 bearer; and receives downlink data from an S1 bearer corresponding to the at least one offloading path, encapsulates the downlink data into a downlink data packet of a MAC frame, forwards the downlink data packet to the WLAN, re-encapsulates the downlink data packet into a first downlink data packet and transmits the first downlink data packet to the UE through the WLAN, thus finishing the communication of the first part of data; where, when the uplink data packet is transmitted between the UE and the WLAN, the source MAC address of the uplink data packet after encapsulation is the first MAC address and the destination MAC address of the uplink data packet after encapsulation is the original MAC address of the WLAN, and when the uplink data packet is transmitted between the WLAN and the base station, the source MAC address of the uplink data packet after encapsulation is the second MAC address and the destination MAC address of the uplink data packet after encapsulation is the MAC address of the base station, the source MAC address of the downlink data packet is the MAC address of the base station and the destination MAC address of the downlink data packet is the second MAC address, the source MAC address of the first downlink data packet is the second MAC address, and the destination MAC address of the first downlink data packet is the first MAC address.

The second case: if the base station communicates with the WLAN by way of a GTP tunnel, the base station creates a new bearer between the base station and the WLAN based on the Create Bearer Request message and the Create Bearer Response message; and the base station receives, over the new bearer, an uplink data packet forwarded by the WLAN, forwards the uplink data packet to an S1 bearer corresponding to the new bearer for transmission after receiving the uplink data packet over the new bearer; and receives downlink data from an S1 bearer corresponding to the at least one radio bearer identifier, forwards the downlink data to the new bearer corresponding to the S1 bearer, encapsulates the downlink data into a second downlink data packet of a MAC frame and transmits the second downlink data packet to the UE through the WLAN, thus finishing the communication of the second part of data; where, when the uplink data packet is transmitted between the UE and the WLAN, the source MAC address of the uplink data packet after encapsulation is the first MAC address and the destination MAC address of the uplink data packet after encapsulation is the original MAC address of the WLAN, the source MAC address of the second downlink data packet is the MAC address of the WLAN and the destination MAC address of the second downlink data packet is the first MAC address.

Based on the data offloading path establishing method according to the above-described first embodiment, the second embodiment and the third embodiment respectively show how a part of data of the base station is offloaded to the WLAN to be communicated with the UE when different protocols are used between the base station and the WLAN.

The Second Embodiment

Figure 9:
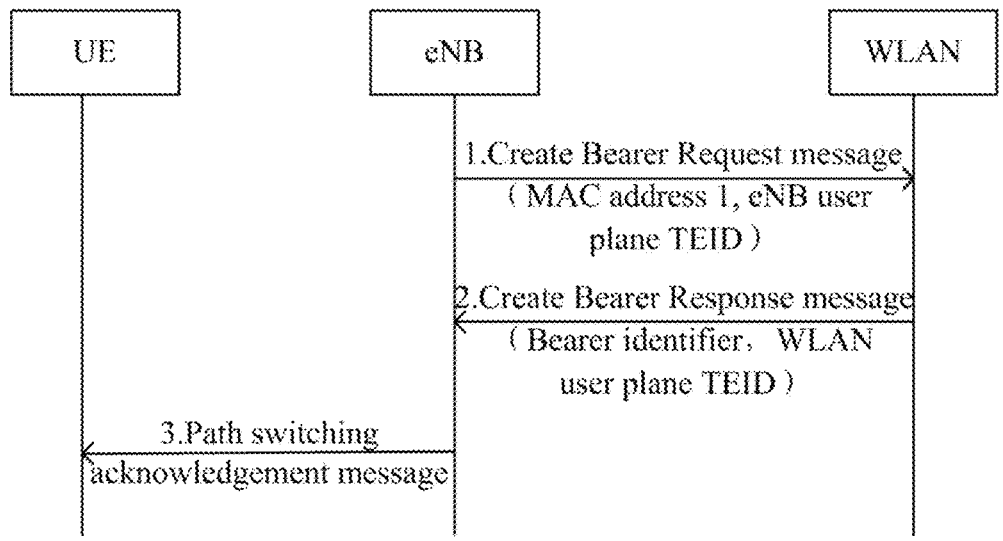
FIG. 9 is a schematic flow chart of a path establishing method according to a second embodiment of the disclosure.

In the second embodiment, GTP protocol is used between the eNB and the WLAN. Specifically, the process of establishing and transferring a path between the eNB and the WLAN is shown in FIG. 9 and the specific process is as follows.

Step1: The eNB transmits a Create Bearer Request message to the specified WLAN, where the parameters in the Create Bearer Request message include a MAC address 1 (i.e., the original MAC address of the UE) and the TEID assigned by the eNB for the user plane.

Step2: The WLAN assigns the bearer identifier and the user plane TEID, and then returns a Create Bearer Response message to the eNB, where parameters in the Create Bearer Response message include the bearer identifier and the user plane TEID assigned by the WLAN.

Step 3: The eNB transmits a path switching acknowledgement message to the UE to notify the UE that a path for offloading data by the eNB to the WLAN is successfully established.

After the abovementioned process, a GTP tunnel is established between the eNB and the WLAN.

Based on the abovementioned steps, the routing method of uplink and downlink data after the path switching will be described below.

Under normal circumstances, the mapping relationship between the bears stored in the eNB is <S1 bearer, radio bearer>, where an S1 bearer field and a radio bearer field may include information that be used to identify the corresponding bearers, respectively, for example, the S1 bearer field includes an S1-TEID the eNB assigns for the bearer and an S1-TEID assigned by the SGW, and the radio bearer field stores a radio bearer identifier. In this case, the data routing method is as follows:

uplink: after receiving data from the radio bearer, the eNB forwards the data to the S1 bearer corresponding to the radio bearer;

downlink: after receiving data from the S1 bearer, the eNB forwards the data to the radio bearer corresponding to the S1 bearer.

After the implementation of the second embodiment, the information stored in the eNB and the WLAN is as follows.

1) The mapping relationship between the bearers stored in the eNB is <S1 bearer, the new bearer>, where the new bearer is the bearer created between the eNB and the WLAN through the abovementioned Step1 and Step2. The information of the new bearer field may be a TEID the eNB assigns for a user plane and a user plane TEID assigned by the WLAN.

2) The information stored in the WLAN is the mapping relationship <new bearer, MAC address 1>.

In this case, the data routing method is as follows.

The uplink and downlink data of the eNB are routed as follows:

uplink: after data is received from the new bearer, the data is forwarded to the S1 bearer corresponding to the new bearer;

downlink: after data is received from the S1 bearer, the data is forwarded to the new bearer corresponding to the S1 bearer.

The uplink and downlink data of the WLAN are routed as follows:

uplink: when a data packet is received with its source MAC address being MAC address 1, the data packet is forwarded to the new bearer corresponding to MAC address 1;

downlink: after data is received from the new bearer, an internal IP packet is encapsulated into a MAC frame, where the source MAC address is the original MAC address of the WLAN, and the destination address is the MAC address corresponding to the new bearer, i.e., MAC address 1.

Accordingly, when the 3GPP access network is congested, the WLAN access network may be idle, then a part of traffic that should be transmitted through the 3GPP access network can be offloaded to the WLAN access network via an air interface of the WLAN access network, thereby providing a user with a better service experience, and improving the radio utilization rate of the 3GPP access network, so that the throughput of the 3GPP access network is increased, the data transmission rate is improved, and the system performance is significantly optimized.

The Third Embodiment

Figure 10:
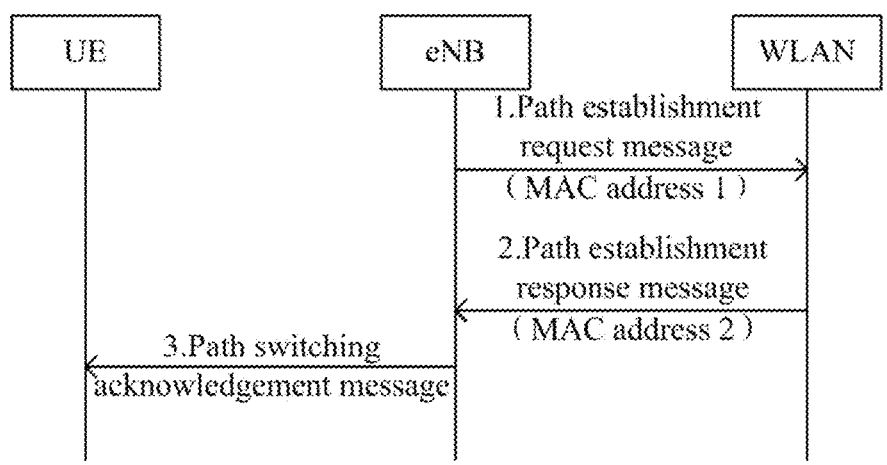
FIG. 10 is a schematic flow chart of a path establishing method according to a third embodiment of the disclosure.

In the third embodiment, layer 2 forwarding is used between the eNB and the WLAN to transmit data. Specifically, the process of establishing and transferring a path between the eNB and the WLAN is shown in FIG. 10 and the specific process is as follows.

Step1: The eNB transmits a path establishment request message to the specified WLAN, where the parameter in the path establishment request message includes the MAC address 1 (i.e., the original MAC address of the UE).

Step2: The WLAN assigns a MAC address (i.e., MAC address 2) for a bearer which transmits the data (the MAC address may be the MAC address of a GW in the WLAN) and then returns a path establishment response message to the eNB, where the parameter in the path establishment response message includes the MAC address 2.

Step 3: The eNB transmits a path switching acknowledgement message to the UE to notify the UE that a path for offloading data by the eNB to the WLAN is successfully established.

Based on the abovementioned steps, the routing method of uplink and downlink data after the path switching will be described below.

Under normal circumstances, the mapping relationship between the bears stored in the eNB is <S1 bearer, radio bearer>, where an S1 bearer field and a radio bearer field include information that can be used to identify the corresponding bearers, respectively, for example, the S1 bearer field includes an S1-TEID the eNB assigns for the bearer and an S1-TEID assigned by the SGW, and the radio bearer field stores a radio bearer identifier. In this case, the data routing method is as follows:

uplink: after receiving data from the radio bearer, the eNB forwards the data to the S1 bearer corresponding to the radio bearer;

downlink: after receiving data from the S1 bearer, the eNB forwards the data to the radio bearer corresponding to the S1 bearer.

After the implementation of the third embodiment, the information stored in the eNB and the WLAN is as follows.

1) The mapping relationship between the bearers stored in the eNB is <S1 bearer, the information of the WLAN>, where the information of the WLAN may be the MAC address of a GW in the WLAN (i.e., the MAC address 2) or a Service Set Identifier (SSID) of the WLAN.

2) The WLAN stores the MAC address 2 in the context of the UE. In addition, it may also store the original MAC address of the UE, i.e., MAC address 1.

In this case, the data routing method is as follows.

The uplink and downlink data of the eNB are routed as follows:

uplink: the eNB receives a MAC frame with the source MAC address being the MAC address 2, and the eNB uses the S1 bearer to transmit an IP packet;

downlink: after receiving the data from the S1 bearer, the UE's data is encapsulated into a MAC frame where the source MAC address is the MAC address of the eNB and the destination MAC address is the MAC address 2.

The uplink and downlink data of the WLAN are routed as follows:

uplink: when a data packet with the source MAC address being the MAC address 1 and the destination MAC address being the original MAC address of the WLAN is received, the IP packet is re-encapsulated so that the source MAC address is the MAC address 2 and the destination MAC address is the MAC address of the eNB;

downlink: when a MAC frame with the source MAC address being the MAC address of the eNB and the destination MAC address being the MAC address 2 is received, the IP packet is re-encapsulated so that the source MAC address is the MAC address 2 and the destination MAC address is the MAC address of the UE, i.e., the MAC address 1.

Accordingly, when the 3GPP access network is congested, the WLAN access network may be idle, then a part of traffic that should be transmitted through the 3GPP access network can be offloaded to the WLAN access network via an air interface of the WLAN access network, thereby providing a user with a better service experience, and improving the radio utilization rate of the 3GPP access network; so that the throughput of the 3GPP access network is increased, the data transmission rate is improved, and the system performance is significantly optimized.

Figure 11:
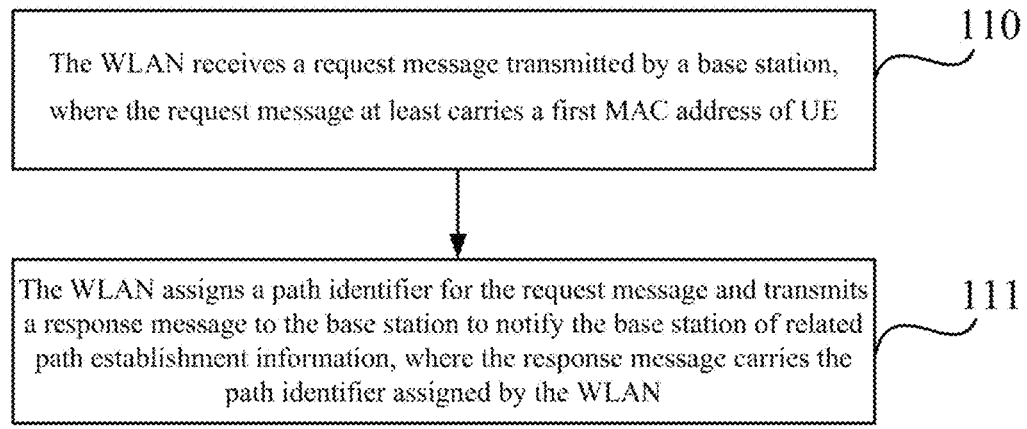
FIG. 11 is a schematic flow chart of a path establishing method according to a fourth embodiment of the disclosure.

Based on the method in which the MeNB offloads data to the SeNB, referring to FIG. 11, the fourth embodiment of the present disclosure provides a data offloading path establishing method, applied to a WLAN, possibly by management equipment in the WLAN. The specific flow is as follows.

Step 110: the WLAN receives a request message transmitted by a base station, where the request message at least carries a first MAC address of UE.

Step 111: the WLAN assigns a path identifier for the request message and transmits a response message to the base station to notify the base station of related path establishment information, where the response message carries the path identifier assigned by the WLAN.

The path identifier may be a second MAC address assigned by the WLAN for the above request message, or a first TEID assigned by the WLAN for the above request message.

Specifically, the WLAN assigns a path identifier for the above request message particularly in the following two cases.

The first case: a gateway in the WLAN assigns the path identifier for the request message.

The second case: an AP in the WLAN assigns the path identifier for the request message.

The second MAC address is used to identify a transmission path, between the WLAN and the base station, for a first part of data to be offloaded.

Specifically, the WLAN receives the request message transmitted by the base station particularly in the following two cases, the request message at least carrying the first MAC address of UE.

The first case: if the WLAN communicates with the base station by way of a layer 2 frame, the WLAN receives a path establishment request message transmitted by the base station, and the path establishment request message is configured to request the WLAN to assign a related path address parameter for the path establishment request message, where the path establishment request message carries the first MAC address of the UE.

The second case: if the WLAN communicates with the base station by way of a GTP tunnel, the WLAN receives a Create Bearer Request message transmitted by the base station, and the Create Bearer Request message is configured to request the WLAN to assign a related path address parameter for the Create Bearer Request message, where the Create Bearer Request message carries the first MAC address of the UE and a second user plane TEID the base station assigns for a user plane.

Specifically, the WLAN assigns a path identifier for the request message and transmits a response message to the base station to notify the base station of the related path establishment information particularly in the following two cases.

The first case: if the WLAN communicates with the base station by way of a layer 2 frame, the WLAN assigns a path identifier for the path establishment request message and transmits a path establishment response message to the base station to notify the eNB of the related path establishment information, where the path establishment response message carries a second MAC address the WLAN assigns for the path establishment request message; or the second case: if the WLAN communicates with the base station by way of a GTP tunnel, the WLAN assigns a path identifier for the Create Bearer Request message and transmits a Create Bearer Response message to the base station to notify the base station of the related path establishment information, where the Create Bearer Response message at least carries a first bearer identifier and a first user plane TEID the WLAN assigns for the Create Bearer Request message.

Figure 12:
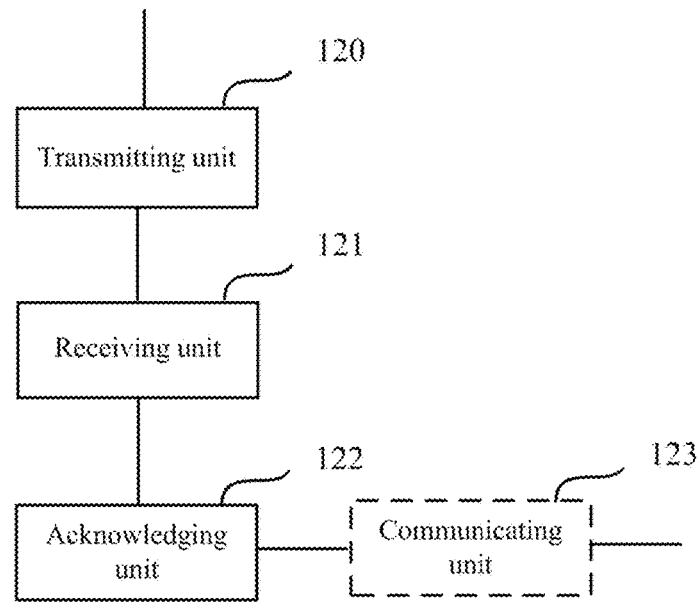
FIG. 12 is a schematic structural diagram of a path establishing device according to a fifth embodiment.

Based on the foregoing embodiments, referring to FIG. 12, the fifth embodiment of the present disclosure provides a data offloading path establishing device, applied to a base station side and including: a transmitting unit 120, a receiving unit 121, an acknowledging unit 122, where:

the transmitting unit 120 is configured to, after ascertaining that a UE is connected to a specified WLAN, transmit a request message to the WLAN, where the request message at least carries a first MAC address of the UE;

the receiving unit 121 is configured to, receive a response message returned from the WLAN for the request message, where the response message at least carries a path identifier the WLAN assigns for the request message; and the acknowledging unit 122 is configured to transmit a path switching acknowledgement message to the UE to notify the UE that a path for offloading data by the base station to the WLAN is successfully established.

Accordingly, when the 3GPP access network is congested, the WLAN access network may be idle, then a part of traffic that should be transmitted through the 3GPP access network can be offloaded to the WLAN access network via an air interface of the WLAN access network, thereby providing a user with a better service experience, and improving the radio utilization rate of the 3GPP access network, so that the throughput of the 3GPP access network is increased, the data transmission rate is improved, and the system performance is significantly optimized.

Optionally, the path identifier received by the receiving unit 121 is a second MAC address assigned by the WLAN for the request message, or a first user plane TEID assigned by the WLAN for the request message.

Optionally, before it is ascertained that the UE is connected to a specified WLAN, the transmitting unit 120 is further configured to:

when an access load of a current network is ascertained to be greater than a preset threshold, transmit an offloading notification message to the UE, where the offloading notification message is configured to notify the UE of an identifier of the specified WLAN and an identifier of a radio bearer identifier that needs to be offloaded to the WLAN; and the receiving unit 121 is further configured to receive an offloading acknowledgement message transmitted by the UE, where the offloading acknowledgement message is configured to acknowledge that the UE accepts the operation of offloading data to the specified WLAN.

Optionally, the receiving unit 121 is further configured to:

receive an RRC message transmitted by the UE in a pre-processing stage, where the RRC message carries the first MAC address of the UE; and save the first MAC address of the UE.

Optionally, when transmitting the request message to the WLAN, the transmitting unit 120 is specifically configured to:

if the base station communicates with the WLAN by way of a layer 2 frame, transmit a path establishment request message to the WLAN, where the path establishment request message is configured to request the WLAN to assign a related path address parameter for the path establishment request message, and the path establishment request message carries the first MAC address of the UE; or if the base station communicates with the WLAN by way of a GTP tunnel, transmit a Create Bearer Request message to the WLAN, where the Create Bearer Request message is configured to request the WLAN to assign a related path address parameter for the Create Bearer Request message, and the Create Bearer Request message carries the first MAC address of the UE and a second user plane TEID the base station assigns for a user plane.

Optionally, when receiving the response message returned from the WLAN for the request message, the receiving unit 121 is specifically configured to:

if the base station communicates with the WLAN by way of a layer 2 frame, receive a path establishment response message the WLAN returns for a path establishment request message, where the path establishment response message carries the second MAC address the WLAN assigns for the path establishment request message; or if the base station communicates with the WLAN by way of a GTP tunnel, receive a Create Bearer Response message the WLAN returns for the Create Bearer Request message, where the Create Bearer Response message at least carries a first bearer identifier and a first user plane TEID the WLAN assigns for the Create Bearer Request message.

Optionally, the device further includes:

a communicating unit 123, configured to communicate a first part of data with the UE through the WLAN based on the path identifier after the path switching acknowledgement message is transmitted to the UE, where the first part of data is data that the base station needs to communicate with the UE through the WLAN.

Optionally, when the first part of data is communicated with the UE through the WLAN based on the path identifier, the communicating unit 123 is specifically configured to:

if the base station communicates with the WLAN by way of a layer 2 frame, establish at least one offloading path between the base station and the WLAN based on the path establishment request message and the path establishment response message; and receive an uplink data packet forwarded by the WLAN, re-encapsulate the uplink data packet into a first uplink data packet, and transmit the first uplink data packet using an S1 bearer; and receive downlink data from an S1 bearer corresponding to the at least one offloading path, encapsulate the downlink data into a downlink data packet of a MAC frame, forward the downlink data packet to the WLAN, re-encapsulate the downlink data packet into a first downlink data packet and transmit the first downlink data packet to the UE through the WLAN, thus finishing the communication of the first part of data; where, when the uplink data packet is transmitted between the UE and the WLAN, a source MAC address of the uplink data packet after encapsulation is the first MAC address and a destination MAC address of the uplink data packet after encapsulation is an original MAC address of the WLAN, and when the uplink data packet is transmitted between the WLAN and the base station, the source MAC address of the uplink data packet after encapsulation is the second MAC address and the destination MAC address of the uplink data packet after encapsulation is the MAC address of the base station, a source MAC address of the downlink data packet after encapsulation is a MAC address of the base station and a destination MAC address of the downlink data packet after encapsulation is the second MAC address, a source MAC address of the first downlink data packet after encapsulation is the second MAC address, and a destination MAC address of the first downlink data packet after encapsulation is the first MAC address.

Optionally, when the first part of data is communicated with the UE through the WLAN based on the path identifier, the communicating unit 123 is specifically configured to:

if the base station communicates with the WLAN by way of a GTP tunnel, create a new bearer between the base station and the WLAN based on the Create Bearer Request message and the Create Bearer Response message; and receive, over the new bearer, an uplink data packet forwarded by the WLAN, forward the uplink data packet to an S1 bearer corresponding to the new bearer for transmission after receiving the uplink data packet over the new bearer; and receive downlink data from the S1 bearer corresponding to at least one radio bearer identifier, forward the downlink data to the new bearer corresponding to the S1 bearer, encapsulate the downlink data into a second downlink data packet of a MAC frame and transmit the second downlink data packet to the UE encapsulating the downlink data, thus finishing the communication of a second part of data; where, when the uplink data packet is transmitted between the UE and the WLAN, a source MAC address of the uplink data packet after encapsulation is the first MAC address and a destination MAC address of the uplink data packet after encapsulation is an original MAC address of the WLAN, a source MAC address of the second downlink data packet after encapsulation is the MAC address of the WLAN and a destination MAC address of the second downlink data packet after encapsulation is the first MAC address.

Figure 13:
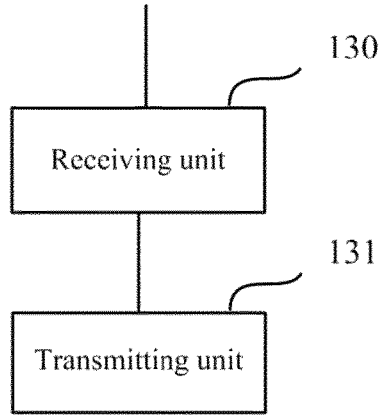
FIG. 13 is a schematic structural diagram of a path establishing device according to a sixth embodiment of the disclosure.

Based on the foregoing embodiments, referring to FIG. 13, the sixth embodiment of the present disclosure provides a data offloading path establishing device, applied to a WLAN and including a receiving unit 130 and a transmitting unit 131, where:

the receiving unit 130 is configured to receive a request message transmitted by a base station, where the request message at least carries a first MAC address of UE; and the transmitting unit 131 is configured to assign a path identifier for the request message and transmit a response message to the base station to notify the base station of the related path establishment information, where the response message carries the path identifier the WLAN assigns.

Accordingly, when the 3GPP access network is congested, the WLAN access network may be idle, then a part of traffic that should be transmitted through the 3GPP access network can be offloaded to the WLAN access network via an air interface of the WLAN access network, thereby providing a user with a better service experience, and improving the radio utilization rate of the 3GPP access network, so that the throughput of the 3GPP access network is increased, the data transmission rate is improved, and the system performance is significantly optimized.

Optionally, the path identifier assigned by the transmitting unit 131 is a second MAC address assigned for the request message, or a first user plane TEID assigned by the WLAN for the request message.

Optionally, when receiving the request message transmitted by the base station, the receiving unit 130 is specifically configured to:

if the device communicates with the base station by way of a layer 2 frame, receive a path establishment request message transmitted by the base station, where the path establishment request message is configured to request the WLAN to assign a related path address parameter for the path establishment request message, and the path establishment request message carries the first MAC address of the UE; or if the device communicates with the base station by way of a GTP tunnel, receive a Create Bearer Request message transmitted by the base station, where the Create Bearer Request message is configured to request the WLAN to assign a related path address parameter for the Create Bearer Request message, and the Create Bearer Request message carries the first MAC address of the UE and a second user plane TEID the base station assigns for a user plane.

Optionally, when a path identifier is assigned for the request message and a response message is transmitted to the base station to notify the base station of related path establishment information, the transmitting unit 131 is specifically configured to:

if the device communicates with the base station by way of a layer 2 frame, assign the path identifier for a path establishment request message and transmit a path establishment response message to the base station to notify the base station of the related path establishment information, where the path establishment response message carries the second MAC address the WLAN assigns for the path establishment request message; or if the device communicates with the base station by way of a GTP tunnel, assign a path identifier for the Create Bearer Request message and transmit a Create Bearer Response message to the base station to notify the base station of the related path establishment information, where the Create Bearer Response message at least carries a first bearer identifier and the first user plane TED the WLAN assigns for the Create Bearer Request message.

Figure 14:
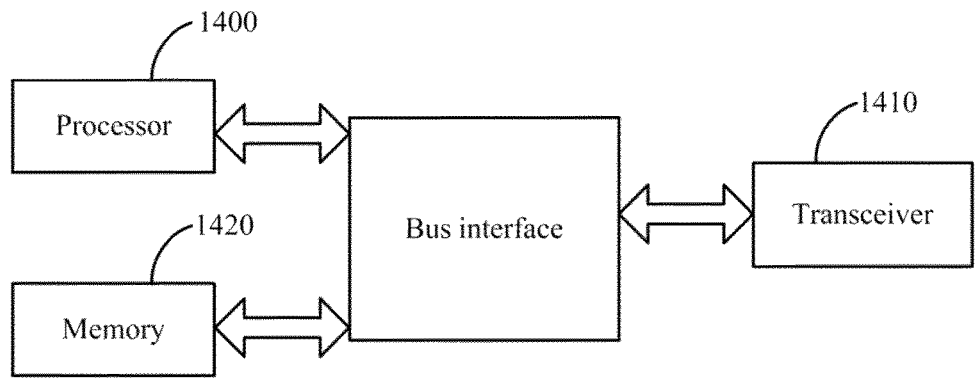
FIG. 14 is a schematic structural diagram of a path establishing device according to the seventh embodiment of the disclosure.

Based on the foregoing embodiments, referring to FIG. 14, the seventh embodiment of the present disclosure provides a network side device, including:

a processor 1400, configured to read a program in a memory 1420 and to perform the following operations:

transmitting, through a transceiver 1410, a request message to a specified WLAN after ascertaining that a UE is connected to the WLAN, where the request message at least carries a first MAC address of the UE; receiving, through the transceiver 1410, a response message returned from the WLAN for the request message, where the response message at least carries a path identifier the WLAN assigns for the request message; and transmitting, through the transceiver 1410, a path switching acknowledgement message to the UE to notify the UE that a path for offloading data by the base station to the WLAN is successfully established.

Accordingly, when the 3GPP access network is congested, the WLAN access network may be idle, then a part of traffic that should be transmitted through the 3GPP access network can be offloaded to the WLAN access network via an air interface of the WLAN access network, thereby providing a user with a better service experience, and improving the radio utilization rate of the 3GPP access network, so that the throughput of the 3GPP access network is increased, the data transmission rate is improved, and the system performance is significantly optimized.

Optionally, the path identifier received by the transceiver 1410 is a second MAC address assigned by the WLAN for the request message or a first user plane TEID assigned by the WLAN for the request message.

Optionally, before ascertaining that the UE is connected to a specified WLAN, the processor 1400 is further configured to:

if an access load of a current network is ascertained to be greater than a preset threshold, transmit, through the transceiver 1410, an offloading notification message to the UE, where the offloading notification message is configured to notify the UE of an identifier of the specified WLAN and an identifier of a radio bearer that needs to be offloaded to the WLAN; and receive, through the transceiver 1410, an offloading acknowledgement message transmitted by the UE, where the offloading acknowledgement message is configured to acknowledge that the UE accepts the operation of offloading data to the specified WLAN.

Optionally, the processor 1400 is further configured to:

receive, through the transceiver 1410, an RRC message transmitted by the UE in a pre-processing stage, where the RRC message carries the first MAC address of the UE; and save the first MAC address of the UE.

Optionally, when transmitting, through the transceiver 1410, a request message to the WLAN, the processor 1400 is specifically configured to:

if the base station communicates with the WLAN by way of a layer 2 frame, transmit, through the transceiver 1410, a path establishment request message to the WLAN, where the path establishment request message is configured to request the WLAN to assign a related path address parameter for the path establishment request message, and the path establishment request message carries the first MAC address of the UE; or if the base station communicates with the WLAN by way of a GTP tunnel, transmit, through the transceiver 1410, a Create Bearer Request message to the WLAN, where the Create Bearer Request message is configured to request the WLAN to assign a related path address parameter for the Create Bearer Request message, and the Create Bearer Request message carries the first MAC address of the UE and a second user plane TEID the base station assigns for a user plane.

Optionally, when receiving, through the transceiver 1410, a response message returned from the WLAN for the request message, the processor 1400 is specifically configured to:

if the base station communicates with the WLAN by way of a layer 2 frame, receive, through the transceiver, a path establishment response message the WLAN returns for the path establishment request message, where the path establishment response message carries the second MAC address the WLAN assigns for the path establishment request message; or if the base station communicates with the WLAN by way of a GTP tunnel, receive, through the transceiver, a Create Bearer Response message the WLAN returns for the Create Bearer Request message, where the Create Bearer Response message at least carries a first bearer identifier and a first user plane TEID the WLAN assigns for the Create Bearer Request message.

Optionally, the processor 1400 is further configured to communicate a first part of data with the UE through the WLAN based on the path identifier after a path switching acknowledgement message is transmitted to the UE through the transceiver 1410, where the first part of data is data that the base station needs to communicate with the UE through the WLAN.

Optionally, when communicating a first part of data with the UE through the WLAN based on the path identifier, the processor 1400 is specifically configured to:

if the base station communicates with the WLAN by way of a layer 2 frame, establish at least one offloading path between the base station and the WLAN based on the path establishment request message and the path establishment response message; and receive an uplink data packet forwarded by the WLAN, re-encapsulate the uplink data packet into a first uplink data packet and transmit the first uplink data packet using an S1 bearer; and receive downlink data from an S1 bearer corresponding to the at least one offloading path, encapsulate the downlink data into a downlink data packet of a MAC frame, forward the downlink data packet to the WLAN, re-encapsulate the downlink data packet into a first downlink data packet and transmit the first downlink data packet to the UE through the WLAN, thus finishing the communication of the first part of data; where, when the uplink data packet is transmitted between the UE and the WLAN, a source MAC address of the uplink data packet after encapsulation is the first MAC address and a destination MAC address of the uplink data packet after encapsulation is an original MAC address of the WLAN, and when the uplink data packet is transmitted between the WLAN and the base station, the source MAC address of the uplink data packet after encapsulation is the second MAC address and the destination MAC address of the uplink data packet after encapsulation is the MAC address of the base station, a source MAC address of the downlink data packet after encapsulation is a MAC address of the base station and a destination MAC address of the downlink data packet after encapsulation is the second MAC address, a source MAC address of the first downlink data packet after encapsulation is the second MAC address, and a destination MAC address of the first downlink data packet after encapsulation is the first MAC address.

Optionally, when communicating a first part of data with the UE through the WLAN based on the MAC address and the path identifier, the processor 1400 is specifically configured to:

if the base station communicates with the WLAN by way of a GTP tunnel, create a new bearer between the base station and the WLAN based on the Create Bearer Request message and the Create Bearer Response message; and receive over the new bearer, an uplink data packet forwarded by the WLAN, forward the uplink data packet to an S1 bearer corresponding to the new bearer for transmission after receiving the uplink data packet over the new bearer; and receive downlink data from the S1 bearer corresponding to at least one radio bearer identifier, forward the downlink data to the new bearer corresponding to the S1 bearer, encapsulate the downlink data into a second downlink data packet of a MAC frame and transmit the second downlink data packet to the UE through the WLAN, thus finishing the communication of a second part of data; where, when the uplink data packet is transmitted between the UE and the WLAN, a source MAC address of the uplink data packet after encapsulation is the first MAC address and a destination MAC address of the uplink data packet after encapsulation is an original MAC address of the WLAN, a source MAC address of the second downlink data packet after encapsulation is the MAC address of the WLAN and a destination MAC address of the second downlink data packet after encapsulation is the first MAC address.

The transceiver 1410 is configured to receive and transmit data under the control of the processor 1400.

In FIG. 14, a bus architecture may include any number of interconnected buses and bridges, where various circuits of one or more processors embodied by the processor 1400 and one or more memories embodied by the memory 1420 are linked together. The bus architecture may also link various other circuits, such as peripherals, voltage stabilizers, and power management circuits, which is well known in the art and therefore will not be further described herein. A bus interface provides an interface. The transceiver 1410 may be a plurality of elements, i.e., it includes a transmitter and a receiver, providing units for communicating with various other devices on a transmission medium. The processor 1400 is responsible for bus architecture management and common processing and the memory 1420 can store data used by the processor 1400 when performing operations.

Figure 15:
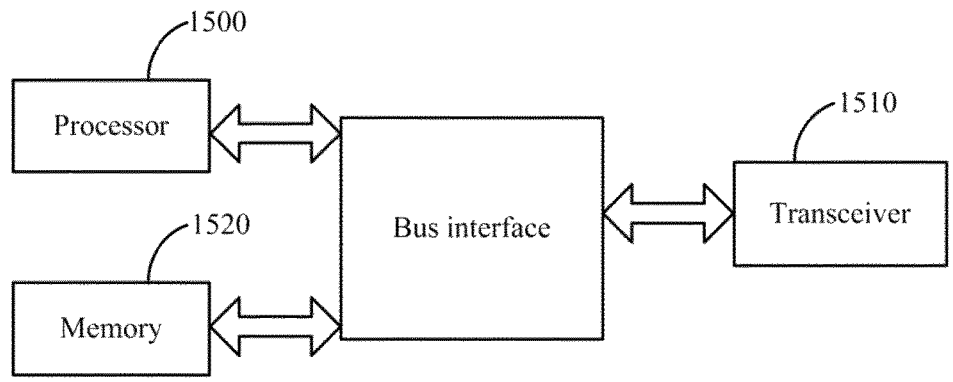
FIG. 15 is a schematic structural diagram of a path establishing device according to a eighth embodiment of the disclosure.

Based on the foregoing embodiments, referring to FIG. 15, the eighth embodiment of the present disclosure provides a network side device, including:

a processor 1500, configured to read a program in a memory 1520 and to perform the following operations: receiving, through a transceiver 1510, a request message transmitted by a base station, where the request message at least carries a first MAC address of a UE; and assigning a path identifier for the request message, and transmitting, through the transceiver 1510, a response message to the base station to notify the base station of related path establishment information, where the response message carries the path identifier the WLAN assigns.

Accordingly, when the 3GPP access network is congested, the WLAN access network may be idle, then a part of traffic that should be transmitted through the 3GPP access network can be offloaded to the WLAN access network via an air interface of the WLAN access network, thereby providing a user with a better service experience, and improving the radio utilization rate of the 3GPP access network, so that the throughput of the 3GPP access network is increased, the data transmission rate is improved, and the system performance is significantly optimized.

Optionally, the path identifier assigned by the processor 1500 is a second MAC address assigned by the WLAN for the request message, or a first user plane TEID assigned by the WLAN for the request message.

Optionally, when receiving, through the transceiver 1510, a request message transmitted by a base station, the processor 1500 is specifically configured to:

if the WLAN communicates with the base station by way of a layer 2 frame, receive, through the transceiver 1510, a path establishment request message transmitted by the base station, where the path establishment request message is configured to request the WLAN to assign a related path address parameter for the path establishment request message, and the path establishment request message carries the first MAC address of the UE; or if the WLAN communicates with the base station by way of a GTP tunnel, receive, through the transceiver 1510, a Create Bearer Request message transmitted by the base station, where the Create Bearer Request message is configured to request the WLAN to assign a related path address parameter for the Create Bearer Request message, and the Create Bearer Request message carries the first MAC address of the UE and a second user plane TEID the base station assigns for a user plane.

Optionally, when a path identifier is assigned for the request message and a response message is transmitted to the base station through the transceiver 1510 to notify the base station of the related path establishment information, the processor 1500 is specifically configured to:

if the network side device communicates with the base station by way of a layer 2 frame, assign the path identifier for the path establishment request message and transmit a path establishment response message to the base station through the transceiver 1510 to notify the base station of the related path establishment information, where the path establishment response message carries a second MAC address the WLAN assigns for the path establishment request message; or if the network side device communicates with the base station by way of a GTP tunnel, assign a path identifier for the Create Bearer Request message and transmit a Create Bearer Response message to the base station through the transceiver 1510 to notify the base station of the related path establishment information, where the Create Bearer Response message at least carries a first bearer identifier and the first user plane TED the WLAN assigns for the Create Bearer Request message.

The transceiver 1510 is configured to receive and transmit data under the control of the processor 1500.

In FIG. 15, a bus architecture may include any number of interconnected buses and bridges, where various circuits of one or more processors embodied by the processor 1500 and one or more memories embodied by the memory 1520 are connected together. The bus architecture may also link various other circuits, such as peripherals, voltage stabilizers, and power management circuits, which is well known in the art and therefore will not be further described herein. A bus interface provides an interface. The transceiver 1510 may be a plurality of elements, i.e., it includes a transmitter and a receiver, providing units for communicating with various other devices on a transmission medium. The processor 1500 is responsible for bus architecture management and common processing and the memory 1520 can store data used by the processor 1500 when performing operations.

To sum up, after ascertaining that UE is connected to a WLAN, a base station transmits a request message to the WLAN network; the base station then receives a response message returned from the WLAN for the request message; and the base station transmits an path switching acknowledgement message to the UE to notify the UE that a path for offloading data by the base station to the WLAN is successfully established. Accordingly, when the 3GPP access network is congested, the WLAN access network may be idle, then a part of traffic that should be transmitted through the 3GPP access network can be offloaded to the WLAN access network via an air interface of the WLAN access network, thereby providing a user with a better service experience, and improving the radio utilization rate of the 3GPP access network, so that the throughput of the 3GPP access network is increased, the data transmission rate is improved, and the system performance is significantly optimized.

It will be appreciated by those skilled in the art that embodiments of the present disclosure may be provided as a method, a system, or a computer program product. Thus, the present disclosure may take the form of a complete hardware embodiment, a complete software embodiment, or an embodiment combining software and hardware aspects. Moreover, the present disclosure may take the form of a computer program product implemented in one or more computer usable storage media (including but not limited to a disk storage, a CD-ROM, an optical memory, etc.) in which a computer usable program code is included.

The present disclosure is described with reference to flowcharts and/or block diagrams of a method, device (system), and a computer program product according to embodiments of the present disclosure. It will be appreciated that each process and/or block in the flowcharts and/or the block diagrams and combinations of processes and/or blocks in the flowcharts and/or the block diagrams may be implemented by computer program instructions. These computer program instructions may be provided to a processor of a general purpose computer, a dedicated computer, an embedded processor, or other programmable data processing equipment to generate a machine such that instructions executed by a processor of a computer or other programmable data processing equipment produce devices for implementing functions specified in one or more processes in the flowcharts and/or one or more blocks in the block diagrams.

These computer program instructions may also be stored in a computer readable memory capable of guiding a computer or other programmable data processing equipment to operate in a particular manner such that instructions stored in the computer readable memory produce a product that includes an instruction device, and the instruction device implements functions specified in one or more processes in the flowcharts and/or one or more blocks in the block diagrams.

These computer program instructions may also be loaded onto a computer or other programmable data processing equipment such that a series of operational steps are performed on a computer or other programmable equipment to produce computer-implemented processing so that instructions performed on a computer or other programmable equipment provide steps for implementing the functions specified in one or more processes in the flowcharts and/or one or more blocks in the block diagrams.

While the preferred embodiments of the present disclosure have been described, those skilled in the art will be able to make further changes and modifications to these embodiments once they know the basic inventive concept. Accordingly, the appended claims are intended to be construed as including the preferred embodiments and all changes and modifications that fall within the scope of the present disclosure.

It will be apparent to those skilled in the art that various changes and modifications can be made to the embodiments of the present disclosure without departing from the spirit and scope of the embodiments of the disclosure. In this way, the present disclosure is intended to embrace such modifications and variations if these modifications and variations of the embodiments of the present disclosure are within the scope of the appended claims and their equivalents.

The invention claimed is:

1. A data offloading path establishing method, applied to a base station side, the method comprising:
    transmitting, by the base station, a request message to a specified Wireless Local Area Network (WLAN) after ascertaining that a User Equipment (UE) is connected to the WLAN network, wherein the request message at least carries a first Media Access Control (MAC) address of the UE;
    if the base station communicates with the WLAN by way of a general packet radio services (GPRS) Tunneling Protocol (GTP) tunnel, receiving, by the base station, a Create Bearer Response message the WLAN returns for a Create Bearer Request message, wherein the Create Bearer Response message at least carries a first bearer identifier and a first user plane Tunnel Endpoint Identifier (TEID) the WLAN assigns for the Create Bearer Request message; and
    transmitting, by the base station, a path switching acknowledgement message to the UE to notify the UE that a path for offloading data by the base station to the WLAN is successfully established.

2. The method according to claim 1, wherein before ascertaining, by the base station, that the UE is connected to a specified WLAN, the method further comprises:
    if an access load of a current network is ascertained to be greater than a preset threshold, transmitting, by the base station, an offloading notification message to the UE, wherein the offloading notification message is configured to notify the UE of an identifier of the specified WLAN and an identifier of a radio bearer that needs to be offloaded to the WLAN; and
    receiving, by the base station, an offloading acknowledgement message transmitted by the UE, wherein the offloading acknowledgement message is configured to acknowledge that the UE accepts the operation of offloading data to the specified WLAN.

3. The method according to claim 1, the method further comprising:
    receiving, by the base station, a Radio Resource Control (RRC) message transmitted by the UE in a pre-processing stage, wherein the RRC message carries the first MAC address of the UE; and
    saving, by the base station, the first MAC address of the UE.

4. The method according to claim 1, wherein transmitting, by the base station, a request message to the WLAN network, wherein the request message at least carries a first MAC address of the UE comprises:
    if the base station communicates with the WLAN by way of a layer 2 frame, transmitting, by the base station, a path establishment request message to the WLAN, wherein the path establishment request message is configured to request the WLAN to assign a related path address parameter for the path establishment request message, and the path establishment request message carries the first MAC address of the UE; or
    if the base station communicates with the WLAN by way of a GTP tunnel, transmitting, by the base station, a Create Bearer Request message to the WLAN, wherein the Create Bearer Request message is configured to request the WLAN to assign a related path address parameter for the Create Bearer Request message, and the Create Bearer Request message carries the first MAC address of the UE and a second user plane TEID the base station assigns for a user plane.

5. A data offloading path establishing method, applied to a WLAN, the method comprising:
    receiving, by the WLAN, a request message transmitted by a base station, wherein the request message at least carries a first MAC address of a UE, wherein assigning, by the WLAN, a path identifier for the request message, and transmitting a response message to the base station to notify the base station of related path establishment information, wherein the response message carries the path identifier the WLAN assigns, comprises:
    if the WLAN communicates with the base station by way of a GTP tunnel, assigning, by the WLAN, the path identifier for the request message and transmitting a Create Bearer Response message to the base station to notify the base station of the related path establishment information, wherein the Create Bearer Response message at least carries a first bearer identifier and the first user plane TEID the WLAN assigns for the Create Bearer Request message; and
    assigning, by the WLAN, a path identifier for the request message, and transmitting a response message to the base station to notify the base station of related path establishment information, wherein the response message carries the path identifier the WLAN assigns.

6. The method according to claim 5, wherein assigning, by the WLAN, a path identifier for the request message comprises:
    assigning, by a gateway in the WLAN, the path identifier for the request message; or assigning, by an Access Point (AP) in the WLAN, the path identifier for the request message;

wherein the path identifier is used to identify a transmission path, between the WLAN and the base station, for a first part of data to be offloaded.

7. The method according to claim 5, wherein receiving, by the WLAN, a request message transmitted by a base station, wherein the request message at least carries a first MAC address of UE, comprises:

if the WLAN communicates with the base station by way of a layer 2 frame, receiving, by the WLAN, a path establishment request message transmitted by the base station, wherein the path establishment request message is configured to request the WLAN to assign a related path address parameter for the path establishment request message, and the path establishment request message carries the first MAC address of the UE; or if the WLAN communicates with the base station by way of a GTP tunnel, receiving, by the WLAN, a Create Bearer Request message transmitted by the base station, wherein the Create Bearer Request message is configured to request the WLAN to assign a related path address parameter for the Create Bearer Request message, and the Create Bearer Request message carries the first MAC address of the UE and a second user plane TEID the base station assigns for a user plane.

8. A data offloading path establishing device, applied to a base station side, the device comprising:

a processor;

a transceiver, configured to receive and transmit data under the control of the processor; and a memory storing at least one instruction, wherein the processor is configured to execute the at least one instruction to:

transmit, through the transceiver, a request message to a specified WLAN after ascertaining that a UE is connected to the WLAN network, wherein the request message at least carries a first MAC address of the UE;

if the base station communicates with the WLAN by way of a GTP tunnel, receive, through the transceiver, a Create Bearer Response message the WLAN returns for the Create Bearer Request message, wherein the Create Bearer Response message at least carries a first bearer identifier and a first user plane TEID the WLAN assigns for the Create Bearer Request message transmit, through the transceiver, a path switching acknowledgement message to the UE to notify the UE that a path for offloading data by the base station to the WLAN is successfully established.

9. The device according to claim 8, wherein before ascertaining that the UE is connected to a specified WLAN, the processor is configured to execute the at least one instruction to:

if an access load of a current network is ascertained to be greater than a preset threshold, transmit, through the transceiver, an offloading notification message to the UE, wherein the offloading notification message is configured to notify the UE of an identifier of the specified WLAN and an identifier of a radio bearer that needs to be offloaded to the WLAN; and receive, through the transceiver, an offloading acknowledgement message transmitted by the UE, wherein the offloading acknowledgement message is configured to acknowledge that the UE accepts the operation of offloading data to the specified WLAN.

10. The device according to claim 8, wherein the processor is configured to execute the at least one instruction to:

receive, through the transceiver, an RRC message transmitted by the UE in a pre-processing stage, wherein the RRC message carries the first MAC address of the UE; and save the first MAC address of the UE.

11. The device according to claim 8, wherein, when transmitting, through the transceiver, a request message to the WLAN, the processor is configured to execute the at least one instruction to:

if the base station communicates with the WLAN by way of a layer 2 frame, transmit, through the transceiver, a path establishment request message to the WLAN, wherein the path establishment request message is configured to request the WLAN to assign a related path address parameter for the path establishment request message, and the path establishment request message carries the first MAC address of the UE; or if the base station communicates with the WLAN by way of a GTP tunnel, transmit, through the transceiver, a Create Bearer Request message to the WLAN, wherein the Create Bearer Request message is configured to request the WLAN to assign a related path address parameter for the Create Bearer Request message, and the Create Bearer Request message carries the first MAC address of the UE and a second user plane TEID the base station assigns for a user plane.

12. A data offloading path establishing device, applied to a WLAN, the device comprising:

a processor;

a transceiver, configured to receive and transmit data under the control of the processor; and a memory storing at least one instruction, wherein the processor is configured to execute the at least one instruction to:

receive, through the transceiver, a request message transmitted by a base station, wherein the request message at least carries a first MAC address of a UE, wherein, when assigning a path identifier for the request message and transmitting, though the transceiver, a response message to the base station to notify the base station of related path establishment information, the processor is configured to execute the at least one instruction to:

if the device communicates with the base station by way of a GTP tunnel, assign the path identifier for the request message and transmit, through the transceiver, a Create Bearer Response message to the base station to notify the base station of the related path establishment information, wherein the Create Bearer Response message at least carries a first bearer identifier and the first user plane TEID the WLAN assigns for the Create Bearer Request message; and assign a path identifier for the request message and transmit, through the transceiver, a response message to the base station to notify the base station of related path establishment information, wherein the response message carries the path identifier the WLAN assigns.

* * * * *